(12) United States Patent
Hwang et al.

(10) Patent No.: US 12,532,310 B2
(45) Date of Patent: Jan. 20, 2026

(54) METHOD AND APPARATUS FOR TRANSMITTING AND RECEIVING INFORMATION RELATED TO INTER-UE COORDINATION IN A WIRELESS COMMUNICATION SYSTEM

(71) Applicant: LG ELECTRONICS INC., Seoul (KR)

(72) Inventors: Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 515 days.

(21) Appl. No.: 17/946,954

(22) Filed: Sep. 16, 2022

(65) Prior Publication Data

US 2023/0090749 A1 Mar. 23, 2023

(30) Foreign Application Priority Data

Sep. 17, 2021 (KR) .................. 10-2021-0125152
Sep. 27, 2021 (KR) .................. 10-2021-0127391

(Continued)

(51) Int. Cl.
*H04W 72/121* (2023.01)
*H04W 72/25* (2023.01)
*H04W 72/542* (2023.01)

(52) U.S. Cl.
CPC ......... *H04W 72/121* (2013.01); *H04W 72/25* (2023.01); *H04W 72/542* (2023.01)

(58) Field of Classification Search
CPC ............... H04W 72/121; H04W 72/25; H04W 72/542
See application file for complete search history.

(56) References Cited

U.S. PATENT DOCUMENTS

2022/0361196 A1* 11/2022 Sarkis ................. H04W 72/569
2024/0015755 A1* 1/2024 Pan ....................... H04W 72/25
2024/0224297 A1* 7/2024 Shin ...................... H04W 76/14

FOREIGN PATENT DOCUMENTS

WO 2020198760 10/2020

OTHER PUBLICATIONS

PCT International Application No. PCT/KR2022/013924, International Search Report dated Jan. 9, 2023, 2 pages.
(Continued)

*Primary Examiner* — Michael Thier
*Assistant Examiner* — Tracy Lauren Raimondo
(74) *Attorney, Agent, or Firm* — LEE, HONG, DEGERMAN, KANG & WAIMEY

(57) ABSTRACT

According to an embodiment of the present disclosure, a method of a first User Equipment (UE) for transmitting information related to an Inter-UE Coordination in a wireless communication system includes: determining information related to an Inter-UE Coordination based on configuration information, and transmitting, to a second UE, the information related to the Inter-UE Coordination. The information related to the Inter-UE Coordination is based on information representing a preferred resource or information representing a conflict of a reserved resource. Based on information for a first condition included in the configuration information, the preferred resource is determined among the resources related to the transmission of the second UE. Based on the information for the second condition included in the configuration information, an RSRP threshold related to the RSRP measured by the first UE is determined.

11 Claims, 17 Drawing Sheets

(30) Foreign Application Priority Data

Sep. 28, 2021 (KR) .................. 10-2021-0128186
Sep. 30, 2021 (KR) .................. 10-2021-0130132

(56) References Cited

OTHER PUBLICATIONS

Qualcomm Incorporated, "Reliability and Latency Enhancements for Mode 2", R1-2108340, 3GPP TSG RAN WG1 Meeting #106-e, Aug. 2021, 37 pages.

Intel Corporation, "Design of Inter-UE Coordination Solutions for Sidelink Communication", R1-2107610, 3GPP TSG RAN WG1 #106-e, Aug. 2021, 24 pages.

Xiaomi, "Discussion on inter-UE coordination", R1-2107900, 3GPP TSG RAN WG1 #106-e, Aug. 2021, 13 pages.

Spreadtrum Communications, "Discussion on inter-UE coordination in sidelink resource allocation", R1-2106715, Aug. 2021, 6 pages.

European Patent Office Application Serial No. 22870364.1, Search Report dated Oct. 15, 2024, 16 pages.

Japan Intellectual Property Office Application No. 2024-516865, Office Action dated Jan. 7, 2025, 4 pages.

Samsung, "On Inter-UE Coordination for Mode2 Enhancements," R1-2105335, 3GPP TSG RAN WG1 #105-e, e-Meeting, May 2021, 7 pages.

Xiaomi, "Discussion on inter-UE coordination," R1-2105545, 3GPP TSG RAN WG1 #105-e, e-Meeting, May 2021, 12 pages.

LG Electronics, "Discussion on inter-UE coordination for Mode 2 enhancements," R1-2107529, 3GPP TSG RAN WG1 Meeting #106-e, e-Meeting, Aug. 2021, 31 pages.

Moderator (LG Electronics), "Feature lead summary for AI 8.11.1.2 Inter-UE coordination for Mode 2 enhancements," R1-2108569, 3GPP TSG RAN WG1 Meeting #106-e, e-Meeting, Aug. 2021, 257 pages.

\* cited by examiner

● : Tx UE
◎ : Rx UE

METHOD AND APPARATUS FOR TRANSMITTING AND RECEIVING INFORMATION RELATED TO INTER-UE COORDINATION IN A WIRELESS COMMUNICATION SYSTEM

TECHNICAL FIELD

The present disclosure relates to a method and an apparatus for transmitting and receiving information related to an inter-UE coordination in a wireless communication system.

BACKGROUND

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

Regarding an inter-UE coordination mechanism, two schemes may be considered. In scheme 1, a UE-A may provide a UE-B with a set of resources that can be used for a resource (re)selection procedure of the UE-B. In scheme 2, a UE-A may provide a UE-B with resource collision related information for resources indicated by sidelink control information (SCI) of the UE-B. The UE-B may avoid a resource collision by reselecting some of the resources indicated by the SCI of the UE-B.

A resource set which may be used for a resource (re) selection procedure of the UE-B in relation to the scheme 1 may include a preferred source and/or a non-preferred resource. The UE-A may determine the preferred resource or the non-preferred resource by using a sensing result thereof. In this case, a specific resource may be excluded from the preferred resource based on a UE capability (e.g., half duplex).

In relation to the scheme 2, information representing a conflict of a resource reserved by the UE-B may be transmitted to the UE-B. In this case, where the reserved resources conflict may be determined based on a comparison of an RSRP measured by the UE-A and an RSRP threshold.

SUMMARY

In relation to the schemes (schemes 1 and 2) of the inter-UE coordination information, the following technical matters may be considered. In terms of the accuracy of the inter-UE coordination information, a specific configuration/condition may be required for each UE in relation to a generation operation of the inter-UE coordination information.

As an example, as described above, a specific resource may be excluded from the preferred resource based on the UE capability (e.g., half duplex). However, when the relevant exclusion operation is applied at one time in determining the preferred resource, available resources may be short. Therefore, the accuracy of the inter-UE coordination information may be lowered.

As an example, when one value unified at one time is used as an RSRP threshold for determining the conflict of the reserved resource without a detailed configuration for each UE, an RSRP measurement capability of the UE which generates the inter-UE coordination information may not be sufficiently considered. Therefore, even in this case, the accuracy of the inter-UE coordination information may be lowered.

The present disclosure proposes a method for solving the problem.

Objects of the present disclosure are not limited to the foregoing, and other unmentioned objects would be apparent to one of ordinary skill in the art from the following description.

In an aspect, a method of a first User Equipment (UE) for transmitting information related to an Inter-UE Coordination in a wireless communication system includes: determining information related to an Inter-UE Coordination based on configuration information, and transmitting, to a second UE, the information related to the Inter-UE Coordination.

The information related to the Inter-UE Coordination is based on information representing a preferred resource related to a scheme 1 or information representing a conflict of a reserved resource related to a scheme 2.

The preferred resource is determined among resources related to a transmission of the second UE and the conflict of the reserved resource is determined based on an RSRP measured by the first UE.

The configuration information includes information for i) a first condition related to the determination of the preferred resource and ii) a second condition related to the determination of the conflict of the reserved resource.

Based on the information on the first condition, the preferred resource is determined among the resources related to the transmission of the second UE. Based on the information for the second condition, an RSRP threshold related to the RSRP measured by the first UE is determined.

Based on the information for the first condition, a resource excluded from the preferred resource may be determined among the resources related to the transmission of the second UE.

The resource excluded from the preferred resource may be a resource belonging to a pre-defined slot, and the pre-defined slot may include a slot in which a SL reception of the first UE is not performed.

Based on the information for the first condition, a resource included in the preferred resource may be determined among the resources related to the transmission of the second UE.

The RSRP threshold determined based on the information on the second condition may be related to one or more RSRPs among the RSRPs measured by the first UE.

The one or more RSRPs may include an RSRP measured based on a Sidelink DeModulation Reference Signal (SL DMRS) of a predefined UE among UEs related to the reserved resources.

The UEs related to the reserved resources may be based on a UE that transmits first sidelink control information (SCI) indicating the reserved resource to the first UE.

Based on the information related to the inter-UE coordination being related to the request of the second UE, information representing the preferred resource related to the scheme 1 may be transmitted.

The configuration information may be based on pre-configured information or information received, from a base station, based on RRC signaling.

In another aspect, a first UE transmitting information related to an inter-UE coordination in a wireless communication system includes: one or more transceivers; one or more processors controlling the one or more transceivers; and one or more memories operatively connected to the one or more processors.

The one or more memories store instructions of performing operations based on being executed by the one or more processors.

The operations include determining information related to an Inter-UE Coordination based on configuration information, and transmitting, to a second UE, the information related to the Inter-UE Coordination.

The information related to the Inter-UE Coordination is based on information representing a preferred resource related to a scheme 1 or information representing a conflict of a reserved resource related to a scheme 2.

The preferred resource is determined among resources related to a transmission of the second UE and the conflict of the reserved resource is determined based on an RSRP measured by the first UE.

The configuration information includes information for i) a first condition related to the determination of the preferred resource and ii) a second condition related to the determination of the conflict of the reserved resource.

Based on the information on the first condition, the preferred resource is determined among the resources related to the transmission of the second UE. Based on the information for the second condition, an RSRP threshold related to the RSRP measured by the first UE is determined.

In yet another aspect, an apparatus of controlling a first UE to transmit information related to an inter-UE coordination in a wireless communication system includes: one or more processors; and one or more memories operatively connected to the one or more processors.

The one or more memories store instructions of performing operations based on being executed by the one or more processors.

The operations include determining information related to an Inter-UE Coordination based on configuration information, and transmitting, to a second UE, the information related to the Inter-UE Coordination.

The information related to the Inter-UE Coordination is based on information representing a preferred resource related to a scheme 1 or information representing a conflict of a reserved resource related to a scheme 2.

The preferred resource is determined among resources related to a transmission of the second UE and the conflict of the reserved resource is determined based on an RSRP measured by the first UE.

The configuration information includes information for i) a first condition related to the determination of the preferred resource and ii) a second condition related to the determination of the conflict of the reserved resource.

Based on the information on the first condition, the preferred resource is determined among the resources related to the transmission of the second UE. Based on the information for the second condition, an RSRP threshold related to the RSRP measured by the first UE is determined.

In still yet another aspect, one or more non-transitory computer-readable media store one or more instructions.

The one or more instructions perform operations based on being executed by one or more processors.

The operations include determining information related to an Inter-UE Coordination based on configuration information, and transmitting, to a second UE, the information related to the Inter-UE Coordination.

The information related to the Inter-UE Coordination is based on information representing a preferred resource related to a scheme 1 or information representing a conflict of a reserved resource related to a scheme 2.

The preferred resource is determined among resources related to a transmission of the second UE and the conflict of the reserved resource is determined based on an RSRP measured by the first UE.

The configuration information includes information for i) a first condition related to the determination of the preferred resource and ii) a second condition related to the determination of the conflict of the reserved resource.

Based on the information on the first condition, the preferred resource is determined among the resources related to the transmission of the second UE. Based on the information for the second condition, an RSRP threshold related to the RSRP measured by the first UE is determined.

In further yet another aspect, a method of a second User Equipment (UE) for receiving information related to an Inter-UE Coordination in a wireless communication system includes receiving, from a first UE, the information related to the Inter-UE Coordination.

The information related to an Inter-UE Coordination is determined based on configuration information.

The information related to the Inter-UE Coordination is based on information representing a preferred resource related to a scheme 1 or information representing a conflict of a reserved resource related to a scheme 2.

The preferred resource is determined among resources related to a transmission of the second UE and the conflict of the reserved resource is determined based on an RSRP measured by the first UE.

The configuration information includes information for i) a first condition related to the determination of the preferred resource and ii) a second condition related to the determination of the conflict of the reserved resource.

Based on the information on the first condition, the preferred resource is determined among the resources related to the transmission of the second UE. Based on the information for the second condition, an RSRP threshold related to the RSRP measured by the first UE is determined.

The method may further include selecting a resource for transmission of the Physical Sidelink Shared Channel (PSSCH) based on information representing the preferred resource related to the scheme 1.

The method may further include transmitting first sidelink control information (SCI). The first SCI may be related to a reserved resource for transmission of the Physical Sidelink Shared channel (PSSCH).

The method may further include reselecting the resource for the transmission of the PSSCH based on the information representing the conflict of the reserved resource related to the scheme 2.

In further still yet another aspect, a second UE receiving information related to an inter-UE coordination in a wireless communication system includes: one or more transceivers; one or more processors controlling the one or more transceivers; and one or more memories operatively connected to the one or more processors.

The one or more memories store instructions of performing operations based on being executed by the one or more processors.

The operations include receiving, from a first UE, the information related to the Inter-UE Coordination.

The information related to an Inter-UE Coordination is determined based on configuration information.

The information related to the Inter-UE Coordination is based on information representing a preferred resource related to a scheme 1 or information representing a conflict of a reserved resource related to a scheme 2.

The preferred resource is determined among resources related to a transmission of the second UE and the conflict of the reserved resource is determined based on an RSRP measured by the first UE.

The configuration information includes information for i) a first condition related to the determination of the preferred resource and ii) a second condition related to the determination of the conflict of the reserved resource.

Based on the information on the first condition, the preferred resource is determined among the resources related to the transmission of the second UE. Based on the information for the second condition, an RSRP threshold related to the RSRP measured by the first UE is determined.

According to the embodiment of the present disclosure, a condition for generating the inter-UE coordination information is configured for each scheme for the inter-UE coordination. Therefore, the accuracy of information (preferred resource or resource conflict information) transmitted and received for the inter-UE coordination can be improved.

More specifically, in the case of Scheme 1, a problem in that discreetly many resources are excluded in determining the preferred resource and the available resources are thus short can be prevented. In the case of Scheme 2, whether the resources conflict can be determined based on an RSRP threshold more suitable for the UE capability.

Effects of the present disclosure are not limited to the foregoing, and other unmentioned effects would be apparent to one of ordinary skill in the art from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

DETAILED DESCRIPTION

Figure 1:
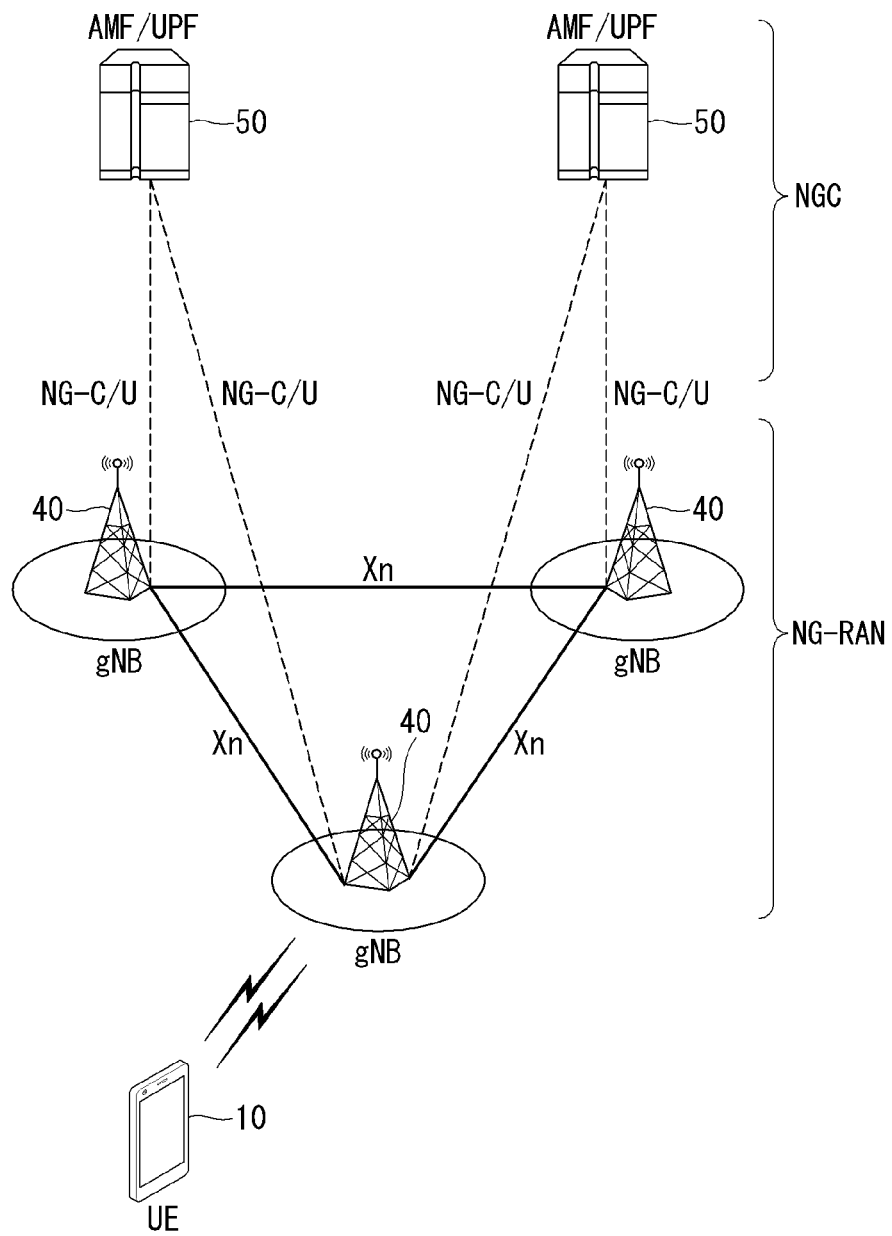
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

| 3GPP LTE | 3GPP NR (e.g. 5G) |
| --- | --- |
| 3GPP TS 36.211: Physical channels and modulation | 3GPP TS 38.211: Physical channels and modulation |
| 3GPP TS 36.212: Multiplexing and channel coding | 3GPP TS 38.212: Multiplexing and channel coding |
| 3GPP TS 36.213: Physical layer procedures | 3GPP TS 38.213: Physical layer procedures for control |
| 3GPP TS 36.214: Physical layer; Measurements | 3GPP TS 38.214: Physical layer procedures for data |
| 3GPP TS 36.300: Overall description | 3GPP TS 38.215: Physical layer measurements |
| 3GPP TS 36.304: User Equipment (UE) procedures in idle mode | 3GPP TS 38.300: Overall description |
| 3GPP TS 36.314: Layer 2 - Measurements | 3GPP TS 38.304: User Equipment (UE) procedures in idle mode and in RRC inactive state |
| 3GPP TS 36.321: Medium Access Control (MAC) protocol | 3GPP TS 38.321: Medium Access Control (MAC) protocol |
| 3GPP TS 36.322: Radio Link Control (RLC) protocol | 3GPP TS 38.322: Radio Link Control (RLC) protocol |
| 3GPP TS 36.323: Packet Data Convergence Protocol (PDCP) | 3GPP TS 38.323: Packet Data Convergence Protocol (PDCP) |
| 3GPP TS 36.331: Radio Resource Control (RRC) protocol | 3GPP TS 38.331: Radio Resource Control (RRC) protocol |
| | 3GPP TS 37.324: Service Data Adaptation Protocol (SDAP) |
| | 3GPP TS 37.340: Multi-connectivity; Overall description |

FIG. 1 shows a structure of an NR system, based on an embodiment of the present disclosure.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
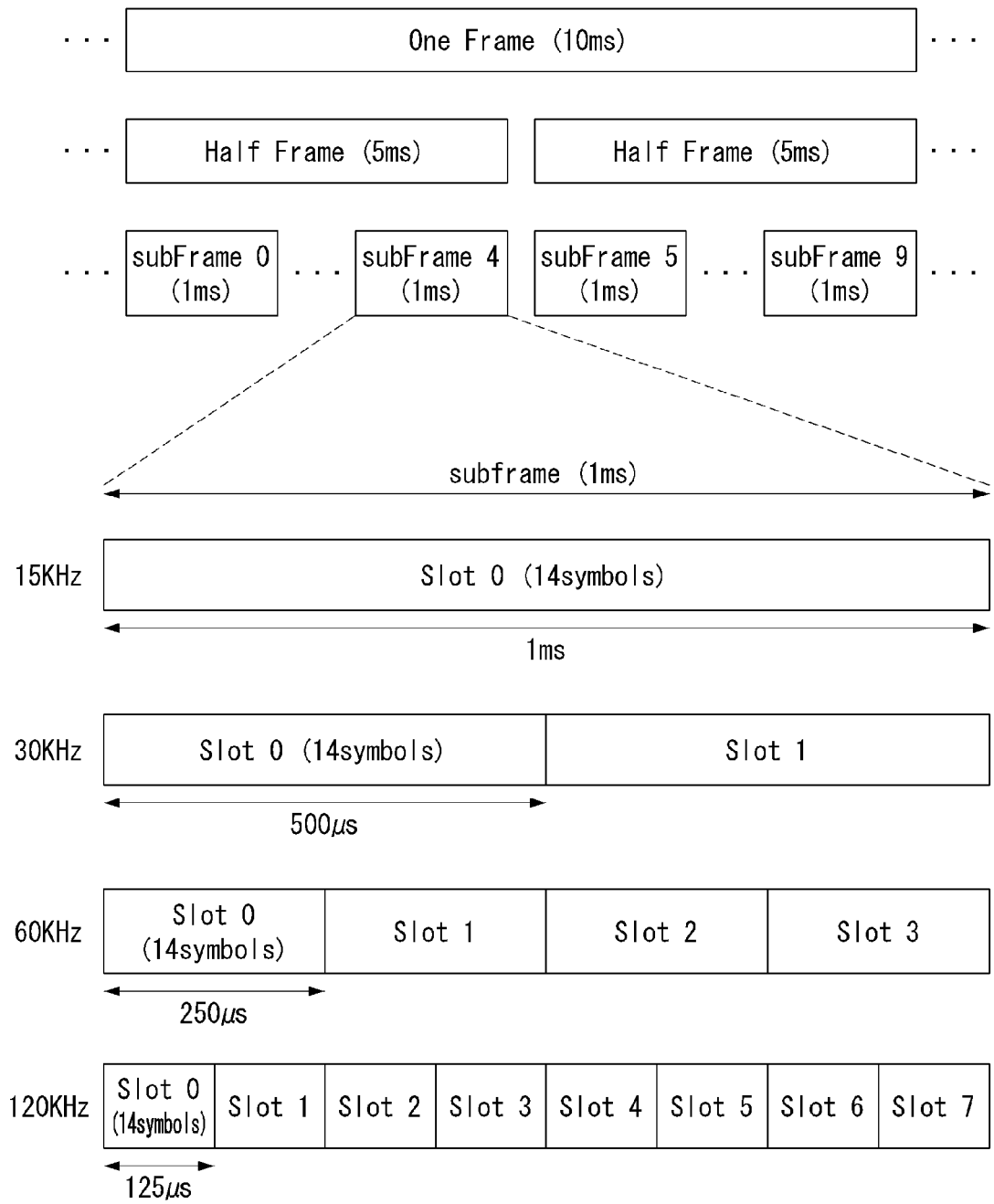
FIG. 2 shows a structure of a radio frame of an NR, based on an embodiment of the present disclosure.

FIG. 2 shows a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range Designation | Corresponding Frequency Range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range Designation | Corresponding Frequency Range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 3:
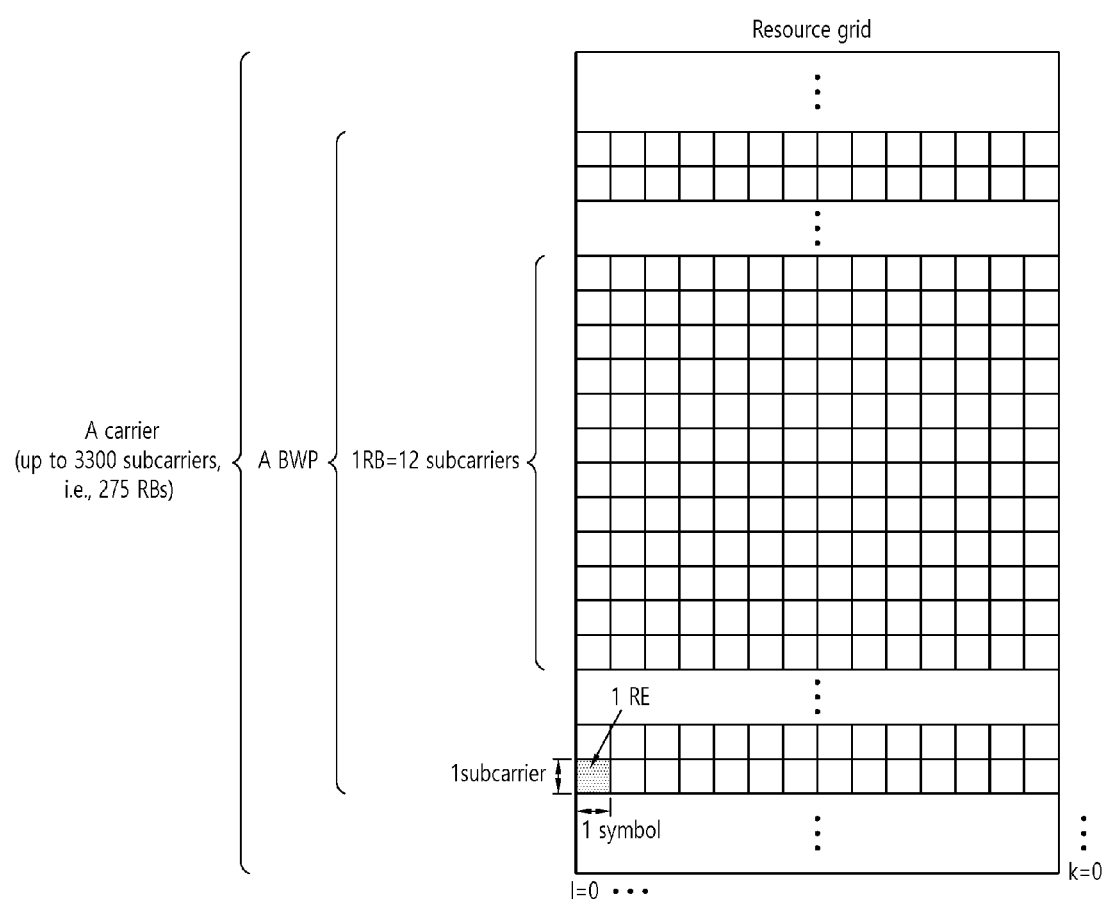
FIG. 3 shows a structure of a slot of an NR frame, based on an embodiment of the present disclosure.

FIG. 3 shows a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Sidelink Synchronization Signal (SLSS) and Synchronization Information

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

A plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

Figure 4:
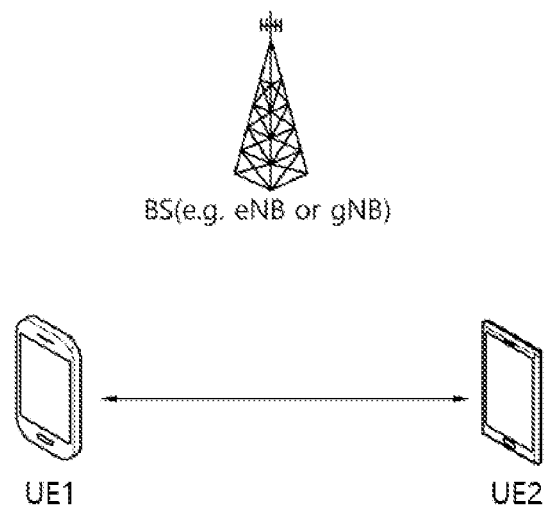
FIG. 4 shows a UE performing V2X or SL communication based on an embodiment of the present disclosure.

FIG. 4 shows a UE performing V2X or SL communication based on an embodiment of the present disclosure.

Referring to FIG. 4, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 5:
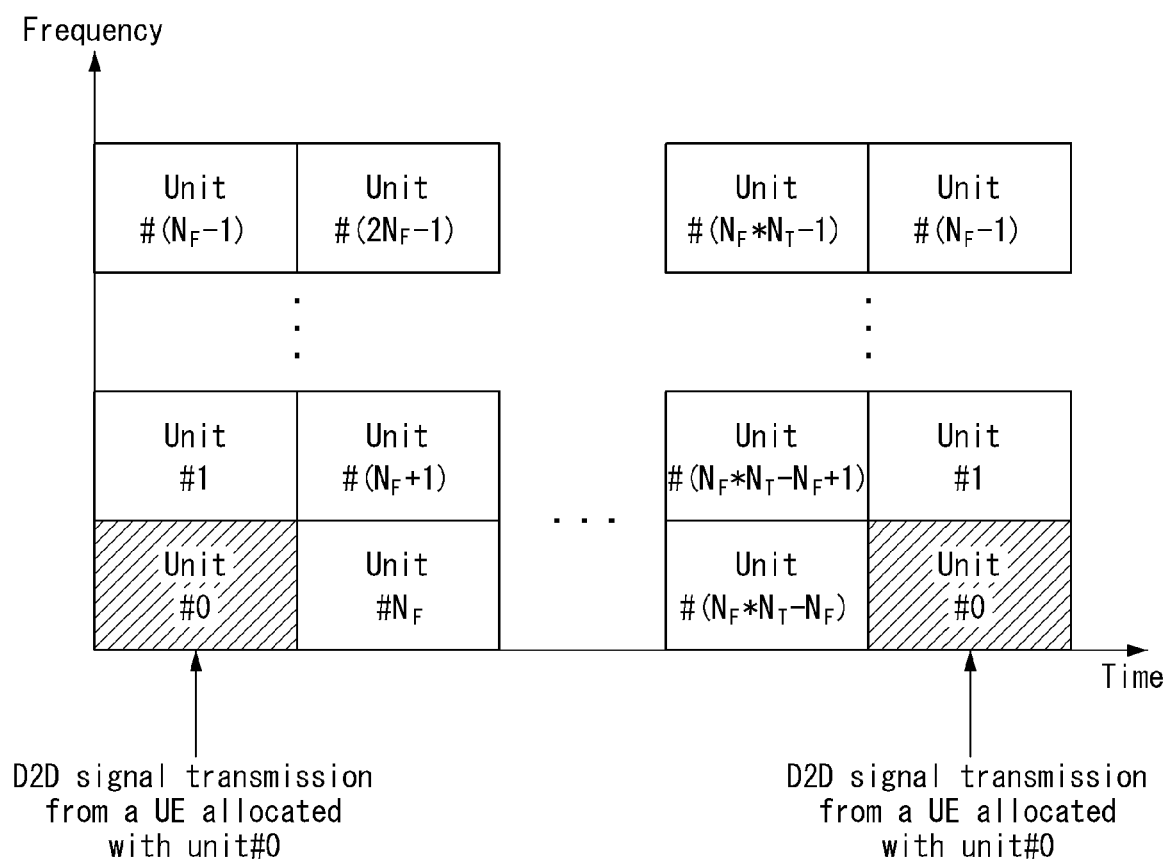
FIG. 5 shows a resource unit for V2X or SL communication based on an embodiment of the present disclosure.

FIG. 5 shows a resource unit for V2X or SL communication based on an embodiment of the present disclosure.

Referring to FIG. 5, all frequency resources of a resource pool may be divided into NF resources, and all time resources of the resource pool may be divided into NT resources. Therefore, NF*NT resource units may be defined in the resource pool. FIG. 5 may show an example of a case where a corresponding resource pool is repeated with a period of NT subframes.

As shown in FIG. 5, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Resource Allocation in SL

Figure 6:
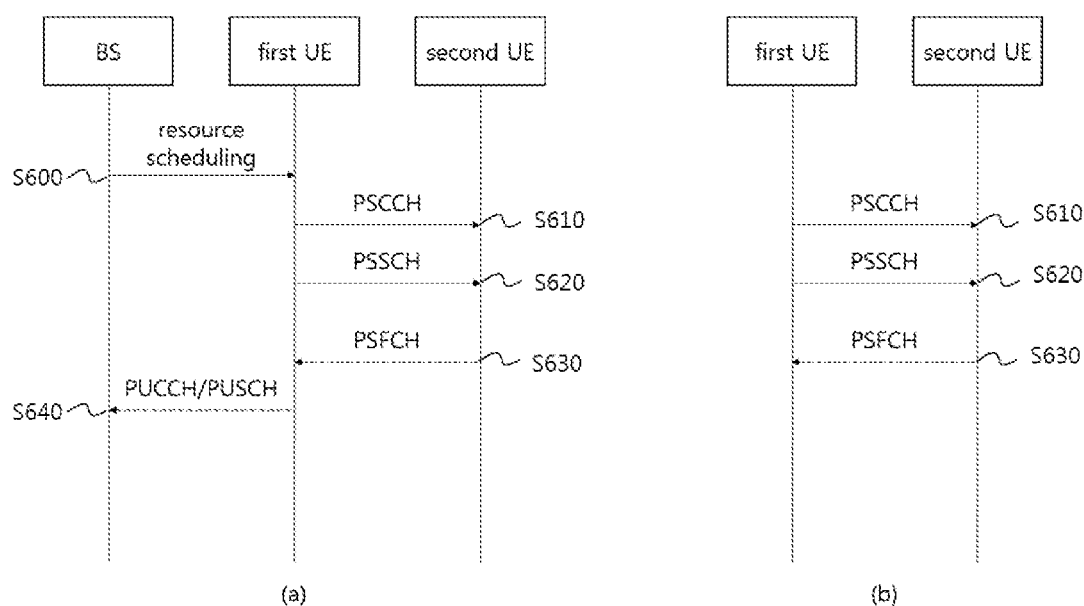
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure.

The embodiment of FIG. 6 may be combined with various embodiments of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 5 shows an example of a DCI for SL scheduling.

TABLE 5

3GPP TS 38.212

7.3.1.4.1 Format 3_0
DCI format 3_0 is used for scheduling of NR PSCCH and NR PSSCH in one cell.
The following information is transmitted by means of the DCI format 3_0 with CRC scrambled by SL-RNTI or SL-CS-RNTI:
Resource pool index -⌈log$_2$ I⌉ bits, where I is the number of resource pools for transmission configured by the higher layer parameter sl-TxPoolScheduling.
Time gap - 3 bits determined by higher layer parameter sl-DCI-ToSL-Trans, as defined in clause 8.1.2.1 of [6, TS 38.214]
HARQ process number - 4 bits as defined in clause 16.4 of [5, TS 38.213]
New data indicator - 1 bit as defined in clause 16.4 of [5, TS 38.213]
Lowest index of the subchannel allocation to the initial transmission -⌈log$_2$(N$_{subChannel}^{SL}$)⌉ bits as defined in clause 8.1.2.2 of [6, TS 38.214]
SCI format 1-A fields according to clause 8.3.1.1:
Frequency resource assignment.
Time resource assignment.
PSFCH-to-HARQ feedback timing indicator -⌈log$_2$ N$_{fb\_timing}$⌉ bits, where N$_{fb\_timing}$ is the number of entries in the higher layer parameter sl-PSFCH-ToPUCCH, as defined in clause 16.5 of [5, TS 38.213]
PUCCH resource indicator - 3 bits as defined in clause 16.5 of [5, TS 38.213].
Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.
Counter sidelink assignment index - 2 bits
2 bits as defined in clause 16.5.2 of [5, TS 38.213] if the UE is configured with pdsch-HARQ-ACK-Codebook = dynamic
2 bits as defined in clause 16.5.1 of [5, TS 38.213] if the UE is configured with pdsch-HARQ-ACK-Codebook = semi-static

TABLE 5-continued

3GPP TS 38.212

Padding bits, if required
7.3.1.4.2 Format 3_1
DCI format 3_1 is used for scheduling of LTE PSCCH and LTE PSSCH in one cell.
The following information is transmitted by means of the DCI format 3_1 with CRC scrambled by
SL-L-CS-RNTI:
Timing offset - 3 bits determined by higher layer parameter sl-TimeOffsetEUTRA, as defined in
clause 16.6 of [5, TS 38.213]
Carrier indicator -3 bits as defined in 5.3.3.1.9A of [11, TS 36.212].
Lowest index of the subchannel allocation to the initial transmission - $\lceil \log_2 (N_{subchannel}{}^{SL}) \rceil$ bits as
defined in 5.3.3.1.9A of [11, TS 36.212].
Frequency resource location of initial transmission and retransmission, as defined in 5.3.3.1.9A of
[11, TS 36.212]
Time gap between initial transmission and retransmission, as defined in 5.3.3.1.9A of [11, TS
36.212]
SL index - 2 bits as defined in 5.3.3.1.9A of [11, TS 36.212]
SL SPS configuration index - 3 bits as defined in clause 5.3.3.1.9A of [11, TS 36.212].
Activation/release indication - 1 bit as defined in clause 5.3.3.1.9A of [11, TS 36.212].

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B. Table 6 shows an example of a $1^{st}$-stage SCI format.

TABLE 6

3GPP TS 38.212

8.3.1.1 SCI format 1-A
SCI format 1-A is used for the scheduling of PSSCH and $2^{nd}$-stage-SCI on PSSCH

TABLE 6-continued

The following information is transmitted by means of the SCI format 1-A:
Priority - 3 bits as specified in clause 5.4.3.3 of [12, TS 23.287] and clause 5.22.1.3.1 of [8, TS 38.321].

Frequency resource assignment - $\left\lceil \log_2\left(\dfrac{N_{subChannel}^{SL}\left(N_{subChannel}^{SL}+1\right)}{2}\right) \right\rceil$ bits when the value of the higher layer parameter
sl-MaxNumPerReserve is configured to 2; otherwise $\left\lceil \log_2\left(\dfrac{N_{subChannel}^{SL}\left(N_{subChannel}^{SL}+1\right)\left(2N_{subChannel}^{SL}+1\right)}{6}\right) \right\rceil$ bits when the value of the higher layer parameter sl-MaxNumPreReserve is configured
to 3, as defined in clause 8.1.2.2 of [6, TS 38.214].
Time resource assignment - 5 bits when the value of the higher layer
parameter sl-MaxNumPerReserve is configured to 2; otherwise 9 bits
when the value of the higher layer parameter sl-MaxNumPerReserve
is configured to 3, as defined in clause 8.1.2.1 of [6, TS 38.214].
Resource reservation period - $\lceil \log_2 N_{rsv\_period} \rceil$ bits as defined in clause
8.1.4 of [6, TS 38.214], where $N_{rsv\_period}$ is the number of entries in the
higher layer parameter sl-ResourceReservePeriodList, if higher layer
parameter sl-MultiReserveResource is configured; 0 bit otherwise.
DMRS pattern - $\lceil \log_2 N_{pattern} \rceil$ bits as defined in clause 8.4.1.1.2 of
[4, TS 38.211], where $N_{pattern}$ is the number of DMRS patterns
configured by higher layer parameter sl-PSSCH-DMRS-
TimePatternList.
$2^{nd}$-stage SCI format - 2 bits as defined in Table 8.3.1.1-1.
Beta_offset indicator - 2 bits as provided by higher layer parameter
sl-BetaOffsets2ndSCI and Table 8.3.1.1-2.
Number of DMRS port - 1 bit as defined in Table 8.3.1.1-3.
Modulation and coding scheme - 5 bits as defined in clause
8.1.3 of [6, TS 38.214].
Additional MCS table indicator - as defined in clause 8.1.3.1 of
[6, TS 38.214]: 1 bit if one MCS table is configured by higher layer
parameter sl-Additional-MCS-Table; 2 bits if two MCS tables are
configured by higher layer parameter sl-Additional-MCS-Table;
0 bit otherwise.
PSFCH overhead indication - 1 bit as defined clause 8.1.3.2 of
[6, TS 38.214] if higher layer parameter sl-PSFCH-Period =
2 or 4; 0 bit otherwise.
Reserved - a number of bits as determined by higher layer
parameter sl-NumReservedBits, with value set to zero.

Table 8.3.1.1-1: $2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6-continued

Table 8.3.1.1-2: Mapping of Beta_offset indicator values to indexes in Table 9.3-2 of [5, TS38.213]

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 8.3.1.1-3: Number of DMRS port(s)

| Value of the Number of DMRS port field | Antenna ports |
|---|---|
| 0 | 1000 |
| 1 | 1000 and 1001 |

Table 7 shows an example of a $2^{nd}$-stage SCI format.

TABLE 7

3GPP TS 38.212

8.4.1.1 SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
HARQ process number - 4 bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID - 8 bits as defined in clause 8.1 of [6, TS 38.214].
Destination ID - 16 bits as defined in clause 8.1 of [6, TS 38.214].
HARQ feedback enabled/disabled indicator - 1 bit as defined in clause 16.3 of [5, TS 38.213].
Cast type indicator - 2 bits as defined in Table 8.4.1.1-1.
CSI request - 1 bit as defined in clause 8.2.1 of [6, TS 38.214].

Table 8.4.1.1-1: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

SCI format 2-B
SCI format 2-B is used for the decoding of PSSCH, with HARQ operation when HARQ-ACK information includes only NACK, or when there is no feedback of HARQ-ACK information.
The following information is transmitted by means of the SCI format 2-B:
HARQ process number - 4 bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID - 8 bits as defined in clause 8.1 of [6, TS 38.214].
Destination ID - 16 bits as defined in clause 8.1 of [6, TS 38.214].
HARQ feedback enabled/disabled indicator - 1 bit as defined in clause 16.3 of [5, TS 38.213].
Zone ID - 12 bits as defined in clause 5.8.11 of [9, TS 38.331].
Communication range requirement - 4 bits determined by higher layer parameter sl-ZoneConfigMCR-Index.

Referring to (a) or (b) of FIG. 6, in step S630, the first UE may receive the PSFCH based on Table 8. For example, the first UE and the second UE may determine a PSFCH resource based on Table 8, and the second UE may transmit HARQ feedback to the first UE using the PSFCH resource.

TABLE 8

3GPP TS 38.213

16.3 UE procedure for reporting HARQ-ACK on sidelink
A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
A UE can be provided, by sl-PSFCH-Period-r16, a number of slots in a resource pool for a period of PSFCH transmission occasion resources. If the number is zero, PSFCH transmissions from the UE in the resource pool are disabled.
A UE expects that a slot $t'^{SL}_k$ ($0 \le k < T'_{max}$) has a PSFCH transmission occasion resource if $k \bmod N_{PSSCH}^{PSFCH} = 0$, where $t'^{SL}_k$ is defined in [6, TS 38.214], and $T'_{max}$ is a number of slots that TABLE 8-continued

3GPP TS 38.213 belong to the resource pool within 10240 msec according to [6, TS 38.214], and $N_{PSSCH}^{PSFCH}$ is provided by sl-PSFCH-Period-r16.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.
A UE is provided by sl-PSFCH-RB-Set-r16 a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch,slot}^{PSFCH}, (i + 1 + j \cdot N_{PSSCH}^{PSFCH}) \cdot M_{subch,slot}^{PSFCH} - 1]$ PRBs from the $M_{PRB,set}^{PSFCH}$ PRBs to slot i among the PSSCH slots associated with the PSFCH slot and sub-channel j, where $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j.
The UE expects that $M_{PRB,set}^{PSFCH}$ is a multiple of $N_{subch} \cdot N_{PSSCH}^{PSFCH}$.
A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers, $N_{type}^{PSFCH} = 1$ and the $M_{subch,slot}^{PSFCH}$ PRBs are associated with the starting sub-channel of the corresponding PSSCH
$N_{type}^{PSFCH} = N_{subch}^{PSSCH}$ and the $N_{subch}^{PSFCH} \cdot M_{subch,slot}^{PSFCH}$ PRBs are associated with one or more sub-channels from the $N_{subch}^{PSSCH}$ sub-channels of the corresponding PSSCH
The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.
A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.
A UE determines a $m_0$ value, for computing a value of cyclic shift $\alpha$ [4, TS 38.211], from a cyclic shift pair index corresponding to a PSFCH resource index and from $N_{CS}^{PSFCH}$ using Table 16.3-1.

Table 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift $\alpha$ [4, TS 38.211], as in Table 16.3-2 if the UE detects a SCI format 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to (a) of FIG. 6, in step S640, the first UE may transmit SL HARQ feedback to the base station through the PUCCH and/or the PUSCH based on Table 9.

TABLE 9

| 3GPP TS 38.213 |
|---|
| 16.5 UE procedure for reporting HARQ-ACK on uplink<br>A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0.<br>For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.<br>For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.<br>For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable<br>if the UE receives a PSFCH associated with a SCI format 2-A with Cast type indicator field value of "10"<br>generate HARQ-ACK information with same value as a value of HARQ-ACK information the UE determines from a PSFCH reception in the PSFCH reception occasion and, if the UE determines that a PSFCH is not received at the PSFCH reception occasion, generate NACK<br>if the UE receives a PSFCH associated with a SCI format 2-A with Cast type indicator field value of "01"<br>generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK<br>if the UE receives a PSFCH associated with a SCI format 2-B or a SCI format 2-A with Cast type indicator field value of "11"<br>generate ACK when the UE determines absence of PSFCH reception for each PSFCH reception occasion from the number of PSFCH reception occasions; otherwise, generate NACK<br>After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.<br>The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission.<br>The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization.<br>The UE generates an ACK if the UE does not transmit a PSCCH with a SCI format 1-A scheduling<br>a PSSCH in any of the resources provided by a configured grant in a single period and for which the UE is provided a PUCCH resource to report HARQ-ACK information. The priority value of the ACK is same as the largest priority value among the possible priority values for the configured grant.<br>A UE does not expect to be provided PUCCH resources or PUSCH resources to report HARQ-ACK information that start earlier than $(N + 1) \cdot (2048 + 144) \cdot \kappa \cdot 2^{\mu} \cdot T_c$ after the end of a last symbol of a last PSFCH reception occasion, from a number of PSFCH reception occasions that the UE generates HARQ-ACK information to report in a PUCCH or PUSCH transmission, where $\kappa$ and $T_c$ are defined in [4, TS 38.211]<br>$\mu = \min(\mu_{SL}, \mu_{UL})$, where $\mu_{SL}$ is the SCS configuration of the SL BWP and $\mu_{UL}$ is the SCS configuration of the active UL BWP on the primary cell<br>N is determined from $\mu$ according to Table 16.5-1 |

| Table 16.5-1: Values of N | |
|---|---|
| $\mu$ | N |
| 0 | 14 |
| 1 | 18 |
| 2 | 28 |
| 3 | 32 |

With reference to slots for PUCCH transmissions and for a number of PSFCH reception occasions ending in slot n, the UE provides the generated HARQ-ACK information in a PUCCH TABLE 9-continued

3GPP TS 38.213 transmission within slot n + k, subject to the overlapping conditions in Clause 9.2.5, where k is a
number of slots indicated by a PSFCH-to-HARQ_feedback timing indicator field, if present, in a
DCI format indicating a slot for PUCCH transmission to report the HARQ-ACK information, or k
is provided by sl-PSFCH-ToPUCCH-CG-Type1-r16. k = 0 corresponds to a last slot for a
PUCCH transmission that would overlap with the last PSFCH reception occasion assuming that the
start of the sidelink frame is same as the start of the downlink frame [4, TS 38.211].
For a PSSCH transmission by a UE that is scheduled by a DCI format, or for a SL configured
grant
Type 2 PSSCH transmission activated by a DCI format, the DCI format indicates to the UE that a
PUCCH resource is not provided when a value of the PUCCH resource indicator field is zero and
a
value of PSFCH-to-HARQ feedback timing indicator field, if present, is zero. For a SL configured
grant Type 1 PSSCH transmission, a PUCCH resource can be provided by sl-N1PUCCH-AN-r16
and sl-PSFCH-ToPUCCH-CG-Type1-r16. If a PUCCH resource is not provided, the UE does not
transmit a PUCCH with generated HARQ-ACK information from PSFCH reception occasions.
For a PUCCH transmission with HARQ-ACK information, a UE determines a PUCCH resource
after determining a set of PUCCH resources for $o_{UCI}$ HARQ-ACK information bits, as described
in Clause 9.2.1. The PUCCH resource determination is based on a PUCCH resource indicator field
[5, TS 38.212] in a last DCI format 3_0, among the DCI formats 3_0 that have a value of a
PSFCH-to-HARQ_feedback timing indicator field indicating a same slot for the PUCCH
transmission, that the UE detects and for which the UE transmits corresponding HARQ-ACK
information in the PUCCH where, for PUCCH resource determination, detected DCI formats are
indexed in an ascending order across PDCCH monitoring occasion indexes.
A UE does not expect to multiplex HARQ-ACK information for more than one SL configured
grants in a same PUCCH.
A priority value of a PUCCH transmission with one or more sidelink HARQ-ACK information bits
is the smallest priority value for the one or more HARQ-ACK information bits.
In the following, the CRC for DCI format 3_0 is scrambled with a SL-RNTI or a SL-CS-RNTI.

Sidelink Control Information (SCI)

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

In various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Figure 7:
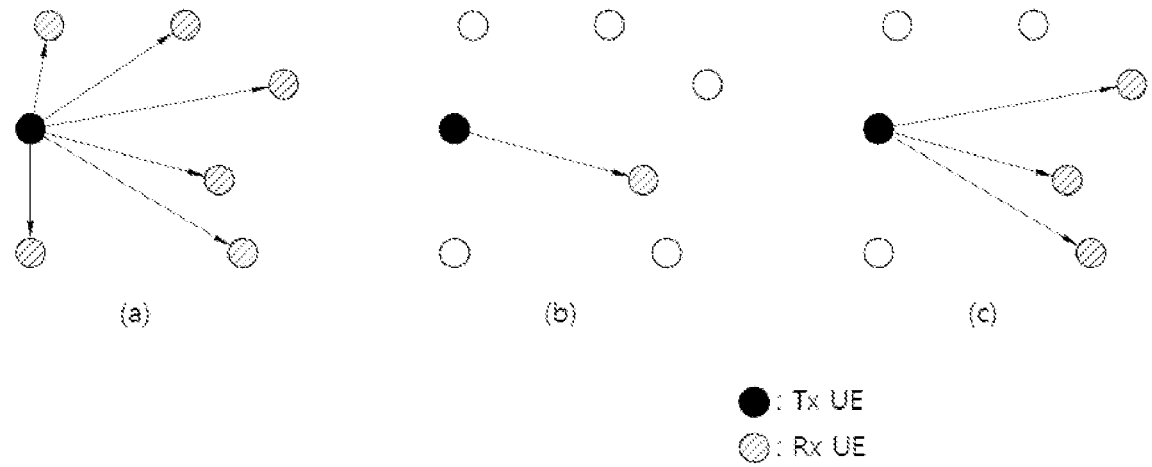
FIG. 7 shows three cast type based on an embodiment of the present disclosure.

FIG. 7 shows three cast types based on an embodiment of the present disclosure.

Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, an RRC connection establishment between UEs will be described.

For V2X or SL communication, a transmitting UE may need to establish a (PC5) RRC connection with a receiving UE. For example, the UE may obtain V2X-specific SIB. For a UE which is configured to transmit V2X or SL communication by a higher layer and which has data to be transmitted, if a frequency at which at least the UE is configured to transmit SL communication is included in the V2X-specific SIB, the UE may establish an RRC connection with another UE without including a transmission resource pool for the frequency. For example, if an RRC connection is established between the transmitting UE and the receiving UE, the transmitting UE may perform unicast communication with respect to the receiving UE through the established RRC connection.

When the RRC connection is established between the UEs, the transmitting UE may transmit an RRC message to the receiving UE.

The receiving UE may perform antenna/resource demapping, demodulation, and decoding for received information. The information may be transferred to the RRC layer via the MAC layer, the RLC layer, and the PDCP layer. Accordingly, the receiving UE may receive the RRC message generated by the transmitting UE.

V2X or SL communication may be supported for a UE of an RRC_CONNECTED mode, a UE of an RRC_IDLE mode, and a UE of an (NR) RRC_INACTIVE mode. That is, the UE of the RRC_CONNECTED mode, the UE of the RRC_IDLE mode, and the UE of the (NR) RRC_INACTIVE mode may perform V2X or SL communication. The UE of the RRC_INACTIVE mode or the UE of the RRC_IDLE mode may perform V2X or SL communication by using a cell-specific configuration included in V2X-specific SIB.

RRC may be used to exchange at least UE capability and AS layer configuration. For example, a UE 1 may transmit UE capability and AS layer configuration of the UE 1 to a UE 2, and the UE 1 may receive UE capability and AS layer configuration of the UE 2 from the UE 2. In case of UE capability transfer, an information flow may be triggered during or after PC5-S signaling for a direct link setup.

Measurement and Reporting for SL

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Hybrid Automatic Repeat Request (HARQ) for SL

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Bandwidth Part and Resource Pool

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
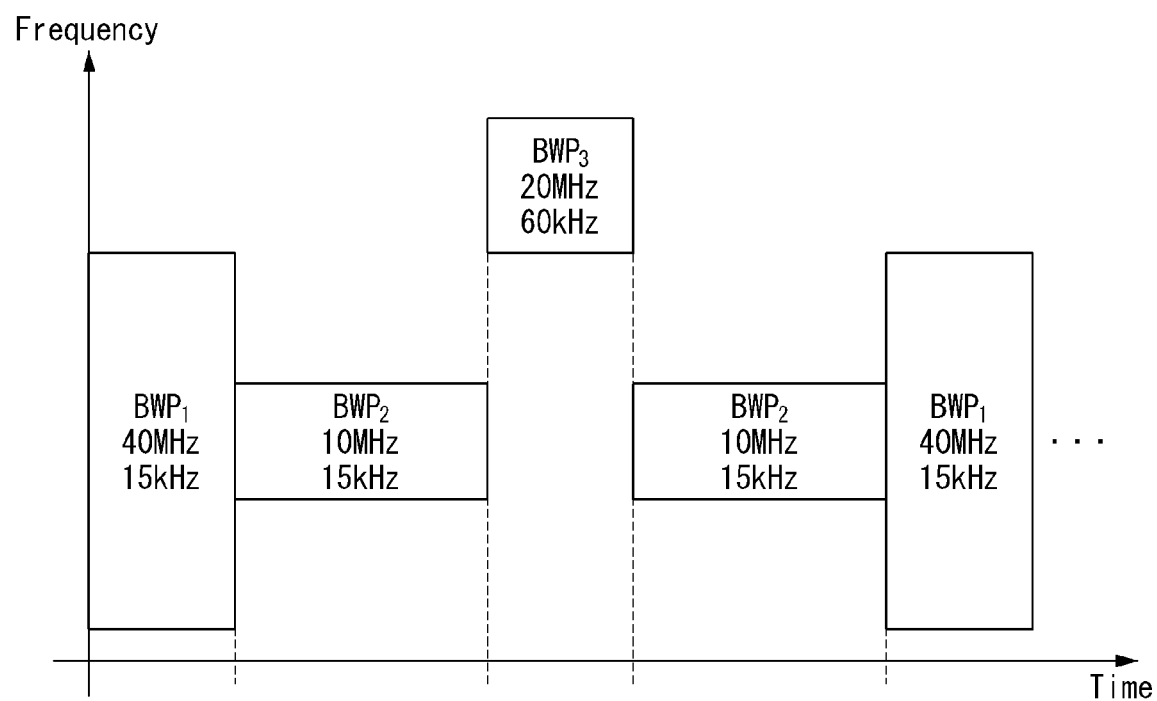
FIG. 8 shows a plurality of BWPs based on an embodiment of the present disclosure.

FIG. 8 shows a plurality of BWPs based on an embodiment of the present disclosure.

Referring to FIG. 8, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

Figure 9:
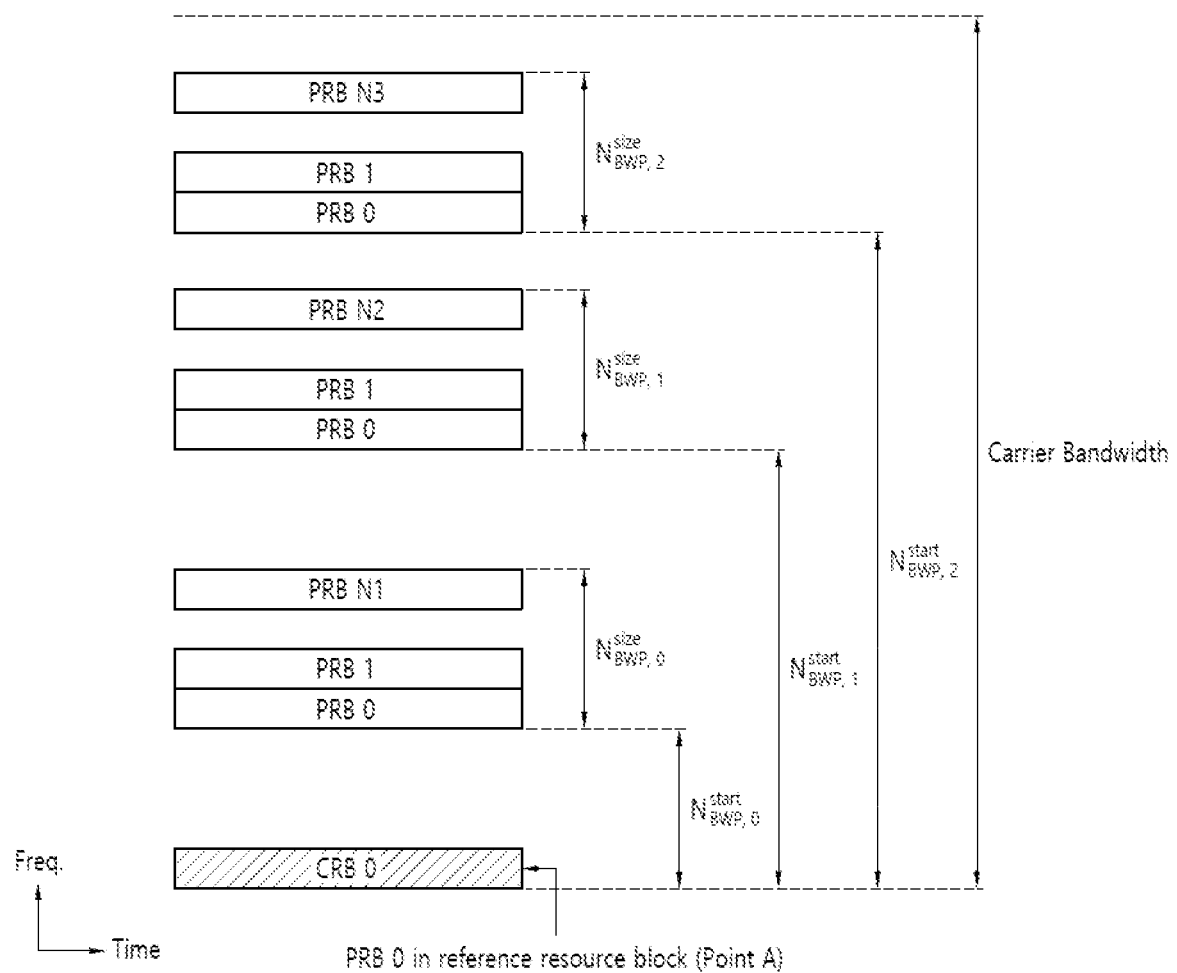
FIG. 9 shows a BWP based on an embodiment of the present disclosure.

FIG. 9 shows a BWP based on an embodiment of the present disclosure. It is assumed in the embodiment of FIG. 9 that the number of BWPs is 3.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

A resource pool may be a group of time-frequency resources that may be used for SL transmission and/or SL reception. From a perspective of the UE, time-domain resources in the resource pool may not be consecutive. A plurality of resource pools may be (pre-)configured to the UE in one carrier. From a perspective of a physical layer, the UE may perform unicast, groupcast, and broadcast communication by using the configured or pre-configured resource pool.

Sidelink Congestion Control

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
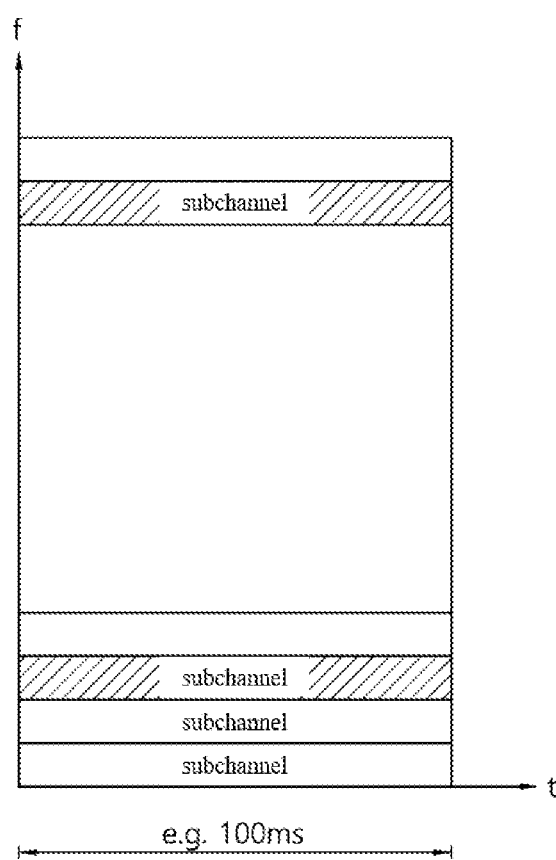
FIG. 10 shows a resource unit for CBR measurement based on an embodiment of the present disclosure.

FIG. 10 shows a resource unit for CBR measurement based on an embodiment of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Figure 11:
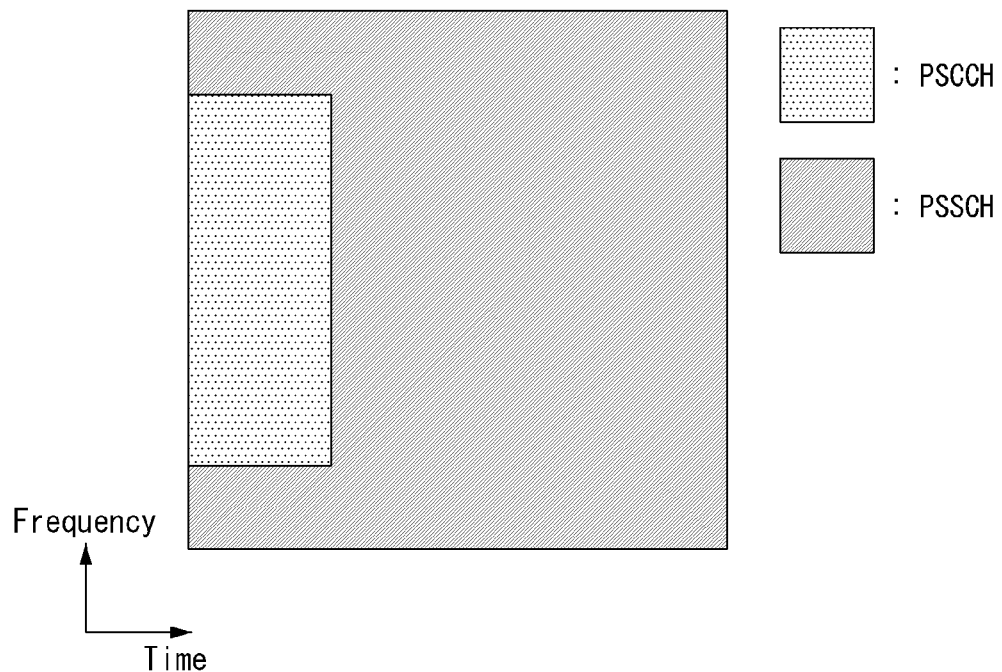
FIG. 11 illustrates a resource pool related to CBR measurement.

FIG. 11 illustrates a resource pool related to CBR measurement.

For example, as shown in the embodiment of FIG. 11, if a PSCCH and a PSSCH are multiplexed, the UE may perform one CBR measurement for one resource pool. Herein, if a PSFCH resource is configured or pre-configured, the PSFCH resource may be excluded in the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Table 10 shows an example of SL CBR and SL RSSI.

TABLE 10

| | SL CBR |
|---|---|
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window (n − a, n − 1), wherein a is equal to 100 or 100 · $2^\mu$ slots, according to higher layer parameter timeWindowSize-CBR. |
| Applicable for | RRC_IDLE intra-frequency, RRC_IDLE inter-frequency, RRC_CONNECTED intra-frequency, RRC_CONNECTED inter-frequency |
| | SL RSSI |
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency, RRC_IDLE inter-frequency, RRC_CONNECTED intra-frequency, RRC_CONNECTED inter-frequency |

Referring to Table 10, the slot index may be based on a physical slot index.

Table 11 shows an example of SL Channel Occupancy Ratio (CR).

TABLE 11

| | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
| Applicable for | RRC_IDLE intra-frequency, RRC_IDLE inter-frequency, RRC_CONNECTED intra-frequency, RRC_CONNECTED inter-frequency |

NOTE 1:
a is a positive integer and b is 0 or a positive integer; a and b are determined by UE implementation with a + b + 1 = 1000 or 1000 · $2^\mu$ slots, according to higher layer parameter timeWindowSize-CR, b < (a + b + 1)/2, and n + b shall not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + b] without packet dropping.
NOTE 4:
The slot index is based on physical slot index.
NOTE 5:
SL CR can be computed per priority level
NOTE 6:
A resource is considered granted if it is a member of a selected sidelink grant as defined in TS 38.321 [7].

In the present disclosure, a wording "configuration or definition" may be interpreted as being (pre-)configured from the base station or the network (via pre-defined signaling (e.g., SIB, MAC signaling, or RRC signaling). For example, "A may be configured" may include "the base station or network (pre-)configures/defines or announces A for the UE". Alternatively, the wording "configuration or definition" may be interpreted as being pre-configured or defined by a system. For example, "A may be configured" may include "A is pre-configured/defined by the system".

The base station may allocate the UE a resource (hereinafter, "SL resource") used for transmission and reception of SL channel/signal. For example, the base station may transmit information related to the resources to the UE. In the present disclosure, a scheme in which the base station allocates the SL resource to the UE may be referred to as mode 1 scheme, mode 1 operation, or resource allocation mode 1.

On the other hand, the UE may select the SL resource within a resource pool based on the sensing. In the present disclosure, a scheme in which the UE selects the SL resource may be referred to as mode 2 scheme, mode 2 operation, or resource allocation mode 3. For example, in the resource allocation mode 2, the UE may detect SCI transmitted by another UE, the UE may identify a resource reserved by another UE based on the SCI, and the UE may acquire an RSRP measurement value. And, the UE may select a resource to be used for the SL transmission except for a specific resource within a resource selection window based on the sensing result.

For the sensing operation, the UE may refer to resource allocation information received via the first SCI. However, due to overhead of the first SCI, an amount of information that the UE can acquire on the first SCI may be limited.

According to various embodiments of the present disclosure, a second UE may transmit additional assistance information in order to assist a sensing operation and/or a resource (re)selection operation of a first UE. For PSSCH detection performance improvement and/or half-duplex limit reduction and/or reserved resource selection for transmission and reception of a specific signal, etc., the first UE may use the assistance information received from the second UE. In an embodiment of the present disclosure, for convenience of explanation, it is assumed that a UE-A transmits assistance information to a UE-B. It is also assumed that the UE-B selects a resource for PSCCH/PSSCH to be transmitted to the UE-A and/or a resource for PSCCH/PSSCH to be transmitted to a UE-C (i.e., a third UE) based on the assistance information received from the UE-A.

Figure 12:
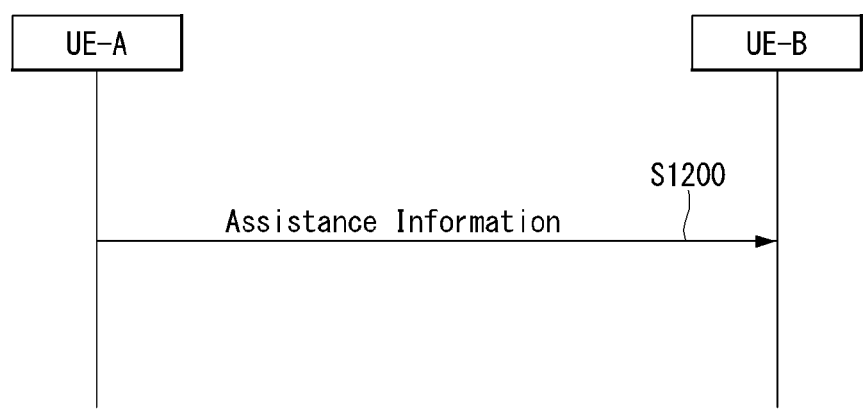
FIG. 12 illustrates a procedure in which a UE-A transmits assistance information to a UE-B based on an embodiment of the present disclosure.

FIG. 12 illustrates a procedure in which a UE-A transmits assistance information to a UE-B based on an embodiment of the present disclosure. The embodiment of FIG. 12 may be combined with various embodiments of the present disclosure.

Referring to FIG. 12, in step S1200, the UE-A may transmit assistance information to the UE-B. For example, the UE-B may select a resource for PSCCH/PSSCH to be transmitted to the UE-A based on the assistance information received from the UE-A, and the UE-B may perform SL transmission using the resource. For example, the UE-B may select a resource for PSCCH/PSSCH to be transmitted to the UE-C based on the assistance information received from the UE-A, and the UE-B may perform SL transmission using the resource. In the present disclosure, the assistance information may be referred to as additional information or coordination information.

According to various embodiments of the present disclosure, the UE-B may transmit, to the UE-A, a signal requesting a transmission of the assistance information. Here, the assistance information/additional information may mean inter-UE coordination information, and the signal requesting the assistance information transmission/assistance information request signal/request for assistance information/request for additional information may mean a request for inter-UE coordination information. That is, in the present disclosure, the assistance information or the additional information may mean the inter-UE coordination information.

The inter-UE coordination information may be triggered by a request of the UE-B or a pre-configured condition. That is, the inter-UE coordination information may be triggered and transmitted by the pre-configured condition even if there is no request of the UE-B.

The inter-UE coordination information and/or the request for inter-UE coordination information may be transmitted based on the PSSCH. For example, the inter-UE coordination information and/or the request for inter-UE coordination information may be transmitted based on MAC-CE (e.g., inter-UE coordination request MAC CE, inter-UE coordination information MAC CE). For example, the inter-UE coordination information and/or the request for inter-UE coordination information may be transmitted based on the second SCI (second stage SCI format 2-C). For example, the inter-UE coordination information and/or the request for inter-UE coordination information may be transmitted based on the MAC-CE and the second SCI (second stage SCI format 2-C).

According to an embodiment of the present disclosure, a UE-A may provide, to UE-B, assistance information (i.e., information related to a scheme (Scheme 1) related to an Inter-UE coordination). Specifically, information related to Scheme 1 may be information (e.g., preferred resource related to PSCCH/PSSCH transmission or a non-preferred resource related to PSCCH/PSSCH transmission) related to resource selection for (later) PSCCH/PSSCH transmission of a UE-B.

Specifically, the information related to Scheme 1 may provide information based on at least one of i) a preferred resource, ii) a non-preferred resource, iii) an SL reception impossible time resource of the UE-A, iv) SL reception impossible time resource information of the UE-A, and/or v) resource information for which the UE-A performs or is scheduled to perform SL reception from another UE. As an example, the SL reception possible time resource of the UE-A may be provided as the preferred resource. As an example, the SL reception possible time resource of the UE-A may be excluded from the non-preferred resource. As an example, the resource which the UE-A performs or is scheduled to perform the SL reception from another UE may be provided as the non-preferred resource. As an example, the resource which the UE-A performs or is scheduled to perform the SL reception from another UE may be provided as the preferred resource.

The UE-B may select a PSCCH/PSSCH resource to be transmitted to the UE-A or UE-C based on the inter-UE coordination information (scheme 1).

Hereinafter, in the present disclosure, 'generation of the assistance information' may mean decision of the scheme (scheme 1) or scheme (scheme 2) related to the inter-UE coordination. As an example, 'generation of the assistance information' may mean the determination of the preferred resource or the non-preferred resource related to scheme 1. As an example, 'generation of the assistance information' may mean determination of a confliction of a reserved resource related to scheme 2.

For example, the UE-A may operate as follows in generating the assistance information (i.e., in determining the preferred resource or non-preferred resource). The UE-A may i) determine/configure a reserved resource indicated by SCI (e.g., SCI format 1-A) corresponding to second SCI as the non-preferred resource for UE-B transmission or ii) determine the reserved resource from the preferred resource for the UE-B transmission according to an RSRP measurement value) for a case of failing to detect the second SCI.

For example, the UE-A may i) determine/configure all resources to which the reserved resource indicated by the SCI (e.g., SCI format 1-A) corresponding to second SCI belongs as the non-preferred resource for UE-B transmission or ii) determine all resources from the preferred resource for the UE-B transmission for the case of failing to detect the second SCI in generating the assistance information. The scheme may be limited to a case where a condition to solve a HALF-DUPLEX problem is configurable/usable in generating the assistance information. The HALF-DUPLEX problem may mean a case where the SL reception by the UE-A is impossible due to a HALF-DUPLEX operation of the UE-A. According to the HALF-DUPLEX operation, while the SL transmission is performed, the SL reception is impossible and when the SL reception is performed, the SL transmission is impossible. In other words, when the condition to solve the HALF-DUPLEX problem is configured in generating the assistance information (determining the preferred resource or non-preferred resource), a resource of a slot which the SL reception by the UE-A is impossible may be i) determined as the non-preferred resource or ii) excluded from the preferred resource.

For example, when the UE-A fails to detect the second SCI in generating the assistance information, the UE-A may not use the reserved resource indicated by the SCI (e.g., SCI format 1-A) corresponding to the second SCI for generating the assistance information.

For example, for the case where the UE-A fails to detect the second SCI in generating the assistance information, the assistance information may be generated by assuming a case where the UE-A is a PSCCH/PSSCH of DESTINATION UE corresponding to the case. For example, for the case where the UE-A fails to detect the second SCI in generating the assistance information, the assistance information may be generated by assuming a case where the UE-A is not the PSCCH/PSSCH of DESTINATION UE corresponding to the case.

Meanwhile, in generating the assistance information by the UE-A, a reference and/or a condition thereof may be different. For example, the UE-A may make information on the reference or condition of the generation of the assistance information be included in the assistance information at the time of transmitting the assistance information. For example, the UE-B may receive the assistance information from the UE-A, and whether to use the assistance information and/or a method for sing the assistance information may be different according to the assistance information generation reference. For example, the UE-B may preferentially avoid a resource which the UE-A expects receiving from another UE among the assistance information which the UE-A transmits to the UE-B, and the information may be used or not used for resource (re)selection according to a situation (e.g., a quantity of available resources) of the UE-B with respect to a resource corresponding to a high interference level observed by the UE-A among the assistance information.

Meanwhile, the UE-A may perform sensing and/or SL reception in order to determine the preferred resource and/or the non-preferred resource for the UE-B transmission. In this case, a slot (hereinafter, referred to as NON-MONITORED SLOT) in which the UE-A may not perform the SL reception may also be shown due to a transmission or RX capability of the UE-A. As an example, the NON-MONITORED SLOT may mean a slot (a slot in which the SL reception is impossible) in which the UE-A does not expect the SL reception due to the HALF-DUPLEX operation of the UE-A.

Meanwhile, the UE-B may still perform sensing in the NON-MONITORED SLOT of the UE-A. In this case, the UE-A may operate as follows. In the generating/determining the preferred resource by the UE-A, the UE-A may exclude a candidate resource which overlaps with all or some (all or some of reserved resources derived from a resource reservation cycle candidate value) of reserved resources corresponding to the NON-MONITORED SLOT from the preferred resource. In the generating/determining the non-preferred resource by the UE-A, the UE-A may determine the candidate resource which overlaps with all or some of the reserved resources corresponding to the NON-MONITORED SLOT as the non-preferred resource.

The available resources of the UE-B may be unnecessarily decreased due to the operation (i.e., utilization of the preferred/non-preferred resource based on the determination by the UE-A) of the UE-A. In order to solve such a problem, the following embodiments may be considered.

For example, an operation of the UE-A to generate additional information (determine the preferred resource/non-preferred resource) based on the reserved resource corresponding to the NON-MONITORED SLOT of the UE-A may be limitedly applied. Specifically, the preferred resource/non-preferred resource determined based on the NON-MONITORED SLOT of the UE-A may be limitedly utilized in a case where the UE-B does not use a sensing result of the UE-B for the resource (re) selection and/or a case where a sensing operation of the UE-B is not supported (in a transmission resource pool). In other words, in the case where the UE-B does not use the sensing result of the UE-B for the resource (re) selection and/or the case where the sensing operation of the UE-B is not supported (in the transmission resource pool), the UE-A may transmit, to the UE-B, inter-UE coordination information including the preferred resource/non-preferred resource determined based on the reserved resource corresponding to the NON-MONITORED SLOT of the UE-A.

For example, the information on the operation/configuration of the UE-B may be announced to the UE-A when the UE-B requests the assistance information. As an example, the request for the assistance information (the request for the inter-UE coordination information) may include information on whether the sensing result of the UE-B being used for the resource (re)selection of the UE-B and/or whether the sensing operation of the UE-B being supported (in the transmission resource pool).

For example, the UE-A may include the generation reference and/or condition in the additional information at the time of transmitting the additional information generated based on the reserved resource corresponding to the NON-MONITORED SLOT of the UE-A to the UE-B. As an example, the inter-UE coordination information transmitted by the UE-A may include information on a reference/condition (e.g., whether the preferred resource/non-preferred resource is determined based on the NON-MONITORED SLOT of the UE-A) used at the time of determining the preferred resource/non-preferred resource.

As an example, the UE-B may use the additional information (the preferred resource/non-preferred resource determined based on the NON-MONITORED SLOT of the UE-A) for the resource (re) selection only in a case of not using the sensing result of the UE-B for the resource (re) selection. As an example, the UE-B may not use the additional information for the resource (re) selection in the case of using the sensing result of the UE-B for the resource (re) selection.

Meanwhile, the UE-A may determine the preferred resource and/or the non-preferred resource of the UE-B transmission based on a resource in which the UE-B receives the TB from another UE. In this case, when a cast type of the received PSSCH (i.e., a PSSCH related to the TB) is a group cast and/or a broadcast, multiple UE-A may unnecessarily generate/transmit the assistance information based on the same resource information. In order to solve such a problem, the following embodiments may be considered.

For example, the UE-A may include a SOURCE ID and/or a DESTINATION ID for the TB at the time of generating additional information for a UE-B transmission resource based on the a resource that receives the TB from another UE. For example, the UE-A may receive the additional information from another UE, and when the SOURCE ID and/or the DESTINATION ID included in the received additional information are/is the same as a SOURCE ID and/or a DESTINATION ID to be included in the additional information which the UE-A is to transmit, the UE-A may omit generation and/or transmission of the additional information.

Through the embodiments, determination of the preferred/non-preferred resource based on the same resource information and/or signaling of the inter-UE coordination information including the preferred/non-preferred resource may not be unnecessarily duplicated and performed.

Meanwhile, the UE-A may determine the preferred/non-preferred resource of the UE-B transmission based on the SL transmission resource (initial transmission resource and/or retransmission resource) of the UE-A or determine the preferred/non-preferred resource of the UE-B transmission based on an SL transmission resource of another UE indicated by the SCI and/or PSCCH received by the UE-A.

For example, a UE which may transmit additional information based on the SL transmission resource of the UE-A may delay a start location of the (initial) transmission resource from a resource (re)selection job triggering time of the UE-A or a start point of a resource selection window of the UE-A to a time after a (pre)configured threshold or a predefined threshold in performing the resource (re)selection of the UE-A.

For example, the UE which may transmit additional information based on the SL transmission resource of the UE-A may delay the start location of the resource selection window from the resource (re)selection job triggering time of the UE-A to the time after the (pre)configured threshold or the predefined threshold in performing the resource (re)selection of the UE-A.

For example, the UE which may transmit additional information based on the SL transmission resource of the UE-A may delay the start location of the resource selection window to the time after the (pre)configured threshold or the predefined threshold in performing the resource (re)selection of the UE-A as compared with the existing location.

Here, the resource selection window may be determined as a time interval of $n+T\_1$ to $n+T\_2$. The n may mean a time (or slot) when the resource selection is triggered. $T\_1$ may represent a parameter related to the start location of the resource selection window. $T\_Proc,1$ which is an upper limit value of the $T\_1$ may be defined as the number of slots depending on a sidelink subcarrier spacing. The $T\_2$ may represent the number of slots equal to or smaller than the number of slots corresponding to a remaining packet delay budget.

For example, the value of the parameter $T\_1$ for the start location (e.g., $n+T\_1$) of the resource selection window of the UE-A may be allowed to be larger than the value of the $T\_Proc,1$ in such a situation. In other words, the value of the $T\_1$ may be configured as a value larger than the value of the $T\_Proc,1$ in order to delay the start location of the resource selection window as compared with the existing location. It can be seen that in the situation, a minimum value of a parameter $T\_2$ for an end location of the resource selection window of the UE-A may be larger than $T\_2,min$ by at least the delay time. In other words, the minimum value of the $T\_2$ may be configured as be larger than the $T\_2,min$ by the delay time in order to delay only the start location of the relevant window while maintaining a length of the resource selection window. For example, when an updated minimum value of the $T\_2$ is larger than a PDB value of the UE transmission, the UE-A may not transmit the additional information based on the above-described reference. In this case, the UE-A may perform the resource (re)selection based on a general scheme (i.e., the resource selection window according to the existing scheme) without the delay.

In the embodiment of the present disclosure, when the UE-A delays the location of the initial transmission resource or the start of the resource selection window, a value related to the delay may be configured to cover a processing time of the UE-A and/or a processing time of the UE-B. As an example, the value related to the delay may be configured to cover at least one of i) a processing time required for generating the additional information, ii) a processing time required for transmitting the additional information, iii) a processing time required for the UE-B to acquire the additional information, and/or iv) a processing time required for the UE-A to process/acquire an additional information request of the UE-B.

For example, the UE which may transmit additional information based on the SL transmission resource of the UE-A may generate and transmit the additional information based on the reference only when the start location of the (initial) transmission resource from the resource (re)selection job triggering time of the U-A or the start point of the resource selection window of the UE-A is equal to or more than the (pre)configured threshold or the predefined threshold.

For example, when the UE-A generates the additional information based on the SL transmission resource of the UE-A, the SL transmission resource may be related to a plurality of TBs and/or a plurality of resource reservation cycles. In this case, information on how many reserved resources for cycles being to be used at the time of generating the additional information may be (pre)configured. For example, when the UE-A generates the additional information based on the SL transmission resource of the UE-A, the SL transmission resource may be related to a plurality of TBs and/or a plurality of resource reservation cycles. In this case, the UE-A may include the information on how many reserved resources for cycles being to be used at the time of generating the additional information in the additional information.

Meanwhile, factors and/or conditions of generating the additional information may be diversified, and used and/or considered generation factors/conditions may be different for each resource pool. For example, additional information generation factors and/or conditions supported for each resource pool may be (pre)configured. Specifically, information on factors and/or conditions for determining/generating the additional information (for each resource pool) may be preconfigured or configured by the BS (e.g., RRC signaling).

For example, when the UE-A is a receiver for the UE-B transmission TB (i.e., an intended receiver for the PSSCH transmission of the UE-B), capability information regarding whether the additional information being used may be exchanged in advance between the UE-A and the UE-B. Thereafter, an operation (the operation of the UE-A/UE-B) related to the additional information may be performed.

For example, a configuration for the additional information may be (pre)configured as one or several configurations for each resource pool. As an example, one or more configurations for the inter-UE coordination information may be based on information preconfigured in the UE. As an example, information including one or more configurations for the inter-UE coordination information for each resource pool may be based on the configuration information received from the BS based on the RRC signaling.

For example, the configuration for each additional information may include whether the additional information is Scheme 1 (e.g., the preferred resource and/or the non-preferred resource for the UE-B transmission) and/or whether the additional information is Scheme 2 (e.g., whether the resource conflicts with the reserved resource of the UE-B). For example, the configuration for each additional information may include the configuration related to Scheme 1 and/or the configuration related to Scheme 2.

For example, the configuration for each additional information may include whether the additional information being the preferred resource and/or the non-preferred resource for the UE-B transmission in Scheme 1.

For example, the configuration for each additional information may include information (e.g., information for a first condition) for the factor or condition used at the time of generating the preferred resource in Scheme 1. In this case, the factor or condition used at the time of generating the preferred resource may be defined/configured as one or more a plurality of factors/conditions. Hereinafter, this will be described in more detail.

As an example, a resource included in the preferred resource among the resources related to the transmission of the UE-B may be determined based on the information on the first condition. As an example, a resource excluded from the preferred resource among the resources related to the transmission of the UE-B may be determined based on the information on the first condition. The resource excluded from the preferred resource may be a resource within the slot (the slot in which the SL reception of the UE-A is not expected to be performed) in which the SL reception of the UE-A may not be performed). The resource excluded from the preferred resource may be the resource which belongs to the NON-MONITORED SLOT. As an example, the information for the first condition may be based on information indicating whether the resource of the slot in which the SL reception of the UE-A may not be performed or the above-described NON-MONITORED SLOT being excluded from the preferred resource. That is, based on the information for the first condition, the resource of the slot in which the SL reception of the UE-A may not be performed or the above-described NON-MONITORED SLOT may be included or not included in the preferred resource.

For example, the configuration for each additional information may include information for the factor or condition used at the time of generating the non-preferred resource in Scheme 1. In this case, the factor or condition used at the time of generating the non-preferred resource may be defined/configured as one or more a plurality of factors/conditions.

For example, the configuration for each additional information may include information indicating whether the additional information transmission is triggered based on a request signal and/or based on an event in Scheme 1. For example, the configuration for each additional information may include one or several information related to the event at the time of event based triggering in Scheme 1. In other words, the configuration for each additional information may include the information for one or more events for the event based triggering in Scheme 1.

For example, the configuration for each additional information may include information indicating the type of information to be included in the request signal at the time of request signal based triggering in Scheme 1.

For example, the configuration for each additional information may indicate a method for transmitting the request signal at the time of the request based triggering (a PDB for the additional information, and a source ID and/or a destination ID for the request signal) in Scheme 1. In other words, the configuration for each additional information may include information indicating the method for transmitting the request signal related to Scheme 1.

For example, the configuration for each additional information may include the information for the factor or condition used at the time of generating a resource confliction indicator in Scheme 2. In this case, the factor or condition used at the time of generating the non-preferred resource may be defined/configured as one or more a plurality of factors/conditions.

For example, the configuration for each additional information may include information indicating a relationship (whether the UE-A is limited to a receiver of the UE-B transmission TB or whether a receiver of transmission corresponding to a confliction with the UE-B transmission is allowed) between the UE-A and the UE-B in Scheme 2.

For example, the configuration for each additional information may include information on a condition (when a priority value of the reception resource of the UE-A is equal to or less or less than a (pre)configured threshold and/or the priority value of the reception value of the UE-A is smaller than a priority value of the UE-B transmission) of the UE-B, and a parameter (a threshold for a priority value) related to the condition of the UE-B transmission in Scheme 2.

For example, the configuration for each additional information may include information on the condition (among RSRP values measured for confliction resources in the UE-A end, a UE corresponding to a smallest or largest RSPR value, the RSRP measurement value is limited to values equal to or more than a (pre)configured threshold) of the UE-B and a parameter (RSRP threshold) related to the condition of the UE-B transmission in Scheme 2. As a specific example, the configuration for each additional information may include information (e.g., information for a second condition) on the RSRP threshold related to the RSRP measured for determining the confliction of the reserved resource related to Scheme 2. Hereinafter, this will be described in more detail.

The RSRP threshold determined based on the information on the second condition may be related to one or more RSRPs among the RSRPs measured by the UE-A. As an example, the one or more RSRPs may include an RSRP measured based on a Sidelink DeModulation Reference Signal (SL DMRS) of a predefined UE among UEs related to the reserved resources. The predefined UE may be a UE (UE-B) determined based on the relationship between the UE-A and the UE-B (whether the UE-A is a reception UE for the UE-B) and/or a size of the measured RSRP value. As an example, the predefined UE may include a transmission UE of the PSSCH with the UE-A as the reception terminal (intended receiver). As an example, the predefined UE may include a UE that transmits SCI (SCI format 1-A) indicating the reserved resource to the UE-A. As an example, the predefined UE may include a transmission UE of the PSCCH with the UE-A as the intended receiver among the UEs that transmit SCI (SCI format 1-A) indicating the reserved resource to the UE-A. As an example, the RSRP threshold determined based on the information on the second condition may be a first RSRP threshold (e.g., RSRP-ThresPerPriorities) related to one RSRP or a second RSRP threshold (e.g., RSRP-ThresWithRsrpMeasurement) related to two RSRPs. The UE-A may determine whether the resource conflicts based on the RSRP measured from one UE among the UEs related to the reserved resources and the first RSRP threshold. For example, the UE-A may determine that the resource conflicts when the measured RSRP is larger than the first RSRP threshold. The UE-A may determine whether the resource conflicts based on the RSRPs (e.g., RSRP1 and RSRP2) measured from the UEs related to the reserved resources and the second RSRP threshold. For example, the UE-A may determine that the resource conflicts when RSRP2 (or RSRP1) is larger than a value acquired by adding the second RSRP threshold to RSRP1 (or RSRP2). The schemes for determining whether the resource conflicts is exemplary for the description, and the RSRP threshold determined based on the information on the second condition is utilized by another scheme, and as a result, the confliction of the reserved resource may also be determined.

For example, the preferred resource for the UE-B transmission which may be included in the additional information of the UE-A may be limited to a case where the number of consecutive sub channels is equal to or larger than the number of specific sub channels (e.g., a predefined number related to the number of consecutive sub channels). That is, the number of consecutive sub channels related to the preferred resource included in the additional information may be equal to or larger than the predefined number. For example, the number of specific sub channels may be a reference sub channel number (e.g., a sub channel number for the UE-B transmission) provided when the UE-B request the additional information to the UE-A. For example, the specific sub channel number may be (pre)configured.

For example, the preferred resource for the UE-B transmission which may be included in the additional information of the UE-A may be limited to a resource in which a transmission pattern for the transmission of the UE-B may be positioned. The transmission pattern may be a pattern derived based on at least one of the sub channel number, the resource reservation cycle, and/or a resource reselection counter.

For example, with respect to the preferred resource for the UE-B transmission which may be included in the additional information of the UE-A, a cycle in which a set of the same sub channel(s) and/or slot resources is repeated may be equal to a resource reservation cycle of the UE-B or a resource reservation cycle value provided in the additional information request of the UE-B or a (pre)configured cycle value.

For example, with respect to the preferred resource for the UE-B transmission which may be included in the additional information of the UE-A, the cycle in which the set of the same sub channel(s) and/or slot resources is repeated may be a division of the resource reservation cycle of the UE-B or the resource reservation cycle value provided in the additional information request of the UE-B or the (pre)configured cycle value.

For example, with respect to the preferred resource for the UE-B transmission which may be included in the additional information of the UE-A, the number of times of the cycle in which the set of the same sub channel(s) and/or slot resources is repeated may be equal to i) a resource reselection counter value of the UE-B, ii) a resource reselection counter value provided in the additional information request of the UE-B, iii) a reselection counter value indicated in the additional information, or iv) a (pre)configured reselection counter value. Alternatively, the number of times of the cycle may be equal to or larger than a value based on one of i) to iv) described above.

For example, with respect to the preferred resource for the UE-B transmission which may be included in the additional information of the UE-A, the relevant additional information may include information on the number of repetition times of the cycle related to the preferred resource.

For example, with respect to the preferred resource for the UE-B transmission which may be included in the additional information of the UE-A, the number of times of the cycle in which the set of the same sub channel(s) and/or slot resources is repeated may be selected so that a multiplication of the cycle for the preferred resource and the number of times of the cycle for the preferred resource is equal to or larger than a multiplication of the resource reservation cycle for the UE-B transmission or provided in the additional information request and the resource reselection counter value.

For example, with respect to the preferred resource for the UE-B transmission which may be included in the additional information of the UE-A, a set of sub channel(s) and/or slot resources in a first cycle may be at least present in the resource selection window of the UE-B or the resource selection window provided in the request signal of the UE-B.

For example, with respect to the preferred resource for the UE-B transmission which may be included in the additional information of the UE-A, the set of the sub channel(s) and/or slot resources in the first cycle may be at least present before the PDB of the UE-B transmission or before the PDB provided in the request signal of the UE-B.

For example, with respect to the preferred resource for the UE-B transmission which may be included in the additional information of the UE-A, the set of the sub channel(s) and/or slot resources in the first cycle may be at least present in a (pre)configured window. For example, the embodiment may also be limitedly applied to a case where the additional information transmission is not based no the request.

In the embodiment of the present disclosure, a constraint for a form of the preferred resource which may be included in the additional information of the UE-A is described, but this is just for convenience of description, and the embodiments may be extensively applied to the operation of the UE-B. Specifically, the above-described may be extensively applied to a case where the UE-B cancels using the preferred resource for the resource (re)selection when the form of the preferred resource does not match the transmission pattern for the transmission of the UE-B when the UE-B receives the preferred resource from the UE-A.

In the embodiment of the present disclosure, the description is made by premising that the form of the preferred resource which may be included in the additional information of the UE-A is based on the transmission form of the UE-B or the information provided in the request of the UE-B. However, this is just for the convenience of the description, and the above-described embodiment may not be based on the request, but may be extensively applied even to the additional information transmitting operation. Specifically, the embodiment may be extended to a form in which each parameter for the UE-B transmission included in the additional information request is replaced with a (pre)configured value when the additional information operates without the additional information request.

For example, the preferred resource for the UE-B transmission which may be included in the additional information of the UE-A may be a sub channel group in which the number of consecutive sub channels for each slot is large.

Meanwhile, in a Mode 2 Resource Allocation (RA) procedure, the UE may exclude a resource corresponding to the transmission pattern from a candidate single-slot resource even when the transmission pattern and a reserved resource of another UE overlap with each other outside the resource selection window.

For example, the non-preferred resource for the UE-B transmission which may be included in the additional information of the UE-A is present outside the resource selection window of the UE-B, a resource at a time before a cycle based on a resource reservation cycle value of the UE-B transmission from the location of the non-preferred resource or a resource at a time before N cycles may be included as the additional information. For example, the N may be the time before N cycles from the non-preferred resource being made to be included in the resource selection window of the UE-B. For example, when the non-preferred resource is expressed as a form of a time and/or frequency resource and the resource reservation cycle in the additional information in the example, it may be additionally indicated at what number the cycle an actual non-preferred resource is present. For example, when the non-preferred resource is expressed as a form of a time and/or frequency resource and the resource reservation cycle in the additional information in the example, a first indication time may additionally indicate the actual non-preferred resource or not.

For example, with respect to the non-preferred resource for the UE-B transmission which may be included in the additional information of the UE-A, the time and/or frequency resource within the first cycle may be at least positioned within the (pre)configured window. For example, in order to express the non-preferred resource outside the window, a resource (pre)configured from the location of the non-preferred resource or at a time before a cycle based on a resource reservation cycle value to be indicated jointly as additional information or the resource at a time before N cycles may be included as the additional information. For example, the N may be the time before the N cycle from the non-preferred resource being made to be included in the window.

In the embodiment of the present disclosure, a scheme of representing a virtual resource within the window as the non-preferred resource with respect to the non-preferred resource outside the window may be limited to a case where the cycle value for the non-preferred resource is equal to or larger than a (pre)configured value or a predefined value (e.g., the resource selection window value or T_2,min value or T_2 value).

In the embodiment of the present disclosure, the scheme of representing the virtual resource within the window as the non-preferred resource with respect to the non-preferred resource outside the window may be limited to a case where the location of the non-preferred resource is positioned within a predetermined time from an end time of the window. For example, the predetermined time may be a (pre)configured value. For example, the predetermined time may be the resource reservation cycle value or a value acquired by multiplying the cycle value by the resource reselection counter value of the UE-B. For example, the resource reservation cycle value and/or the resource reselection counter value of the UE-B may be provided when the UE-B requests the additional information to the UE-A.

For example, the non-preferred resource for the UE-B transmission which may be included in the additional information of the UE-A is present within a time after the resource reservation cycle value of the UE-B transmission from the end of the resource selection window of the UE-B and/or the end of the resource selection window and/or a time after a multiplication of the resource reservation cycle value of the UE-B transmission and the resource reselection counter from the window the resource selection window.

For example, information on a resource for which the UE-A does not expect the SL reception from the UE-B with respect to the reserved resource which the UE-A derives from the SCI transmitted by the UE-B may be a case where the location of the UE-A is present within COMMUNICATION RANGE REQUIMRENT from the center of ZONE indicated by the SCI of the UE-B.

For example, an earliest time of a resource which the UE-A may indicate at the time of indicating the preferred resource and/or the non-preferred resource to the UE-B may be a slot (belonging to the resource pool) after a specific time the time from the time or slot of transmitting the additional information of the UE-A. For example, the specific time may be a sum of T_Proc,0 and T_Proc,1 or may have the value of the sum as a minimum value or a maximum value. In this case, the T_Proc,0 may mean a processing time for the sensing result of the UE. As an example, the resource (re)selection of the UE after the T_Proc,0 from a time (an end point of the sensing window) when the window in which the UE performs sensing ends may be triggered. That is, the end point of the sensing window may be a time (n-T_Proc,0) before the T_Proc,0 from slot n in which the resource (re)selection is triggered. For example, the specific time is a next slot of the time of transmitting the additional information, and the earliest time of the resource which may be indicated in the additional information may be after the sum of T_Proc,0 and T_Proc,1 from the additional information indication time. For example, the specific time may be (pre)configured. For example, the specific time may be may be transmitted jointly at the time of transmitting the additional information.

For example, when the UE-A uses a plurality of time resource indicator values (TRIV) at the time of indicating the preferred resource and/or non-preferred resource to the UE-B, a start reference location of the TRIV may be a last slot which may be indicated by a previous TVIV or an immediately next slot.

For example, when the UE-A uses the plurality of time resource indicator values (TRIV) at the time of indicating the preferred resource and/or non-preferred resource to the UE-B, the start reference location of the TRIV may be the last slot which is indicated by a previous TVIV or the immediately next slot.

For example, when the UE-A uses the plurality of time resource indicator values (TRIV) at the time of indicating the preferred resource and/or non-preferred resource to the UE-B, the start reference location of the TRIV may be succession of the start reference location of the previous TRIV.

For example, when the UE-A uses the plurality of time resource indicator values (TRIV) at the time of indicating the preferred resource and/or non-preferred resource to the UE-B, the start reference location of the TRIV may be indicated by the additional information. For example, the slot may be the slot belonging to the resource pool. For example, the start reference location of the TRIV may be a multiple form of the resource reservation cycle of the UE-B transmission based on the previous start reference location or based on the time of transmitting the additional information.

For example, the time resource indicator value (TRIV) used for indicating the additional information may continuously indicate resources as large as N which is predefined or (pre)configured. For example, when the N value is predefined, the N value may be 2 or 3. For example, in the case of N=2, the value of the TRIV may be determined as a combination of a first offset value and a second offset value. For example, the first offset value may be smaller than the second offset value.

For example, the time resource which may be indicated by the additional information may be a resource within a time interval from a resource selection window start of the UE-B up to T_2,min. The embodiment is to consider the following technical matters. An end time of an actual resource selection window may vary depending on the time, and in this case, a size of a time resource indicator indicated by the additional information may also be changed. On the contrary, T_2,min is a (pre)configured value, and when the time resource indicator is determined based on T_2,min, the size of the time resource indicator may be maintained equally.

For example, when the UE indicates the preferred resource/non-preferred resource to the UE-B, the relevant preferred resource and/or non-preferred resource may be indicated as a form of an available resource candidate (candidate single-slot resource) used in MODE 2 RA. In this case, when a plurality of available resource candidates are positioned in the same slot and/or positioned in consecutive sub channels, the UE-A may use the number of sub channels for expressing the number of consecutive sub channels in a frequency resource indicator value (FRIV). For example, with respect to the number of consecutive sub channels, the number of consecutive sub channels for a plurality of resources may be a smallest value or a largest value in a resource indication group. For example, the total number of sub channels in the FRIV may be the total number of sub channels constituting the resource pool which the UE-A uses at the time of generating the additional information. For example, the total number of sub channels in the FRIV may be a value acquired by subtracting 1 which is the number of sub channels for the UE-B transmission from the total number of sub channels constituting the resource pool which the UE-A uses at the time of generating the additional information.

For example, a case where the UE-A uses the reserved resource which the UE-A derives from the SCI received from another UE at the time of indicating the preferred resource and/or non-preferred resource to the UE-B may be assumed. In this case, the following embodiments may be considered.

According to an embodiment, the UE-A may receive (transmission) resource pool information for the UE-B transmission from the UE-B in advance. For example, the resource pool information may be provided by using PC5-RRC signaling between the UE-A and the UE-B.

According to an embodiment, the UE-B may select the UE-A among UEs which use the same (transmission) resource pool in selecting the UE-A.

According to an embodiment, the UE-A may select the UE-B among the UEs which use the same (transmission) resource pool in selecting the UE-B.

For example, when a plurality of TRIV and FRIV combinations are used for the UE-A to indicate the preferred resource and/or non-preferred resource to the UE-B, a plurality of FRIVs may interlock with a single TRIV. In this case, non-consecutive frequency resources may be indicated with different FRIVs in the same slot with respect to slots indicated by the TRIV.

For example, when the plurality of TRIV and FRIV combinations are used for the UE-A to indicate the preferred resource and/or non-preferred resource to the UE-B, a plurality of TRIVs may interlock with a single FRIV.

Meanwhile, the UE-B may request additional information transmission to different UE-As. The UE-B may receive the additional information form a plurality of UE-As. In this case, the UE-B may be required to distinguish for which additional information request the received additional information is. For example, the UE-A may transmit information (e.g., request ID) included in the request of the UE-B jointly at the time of transmitting the additional information to the UE-B. For example, the UE-B may transmit the request signal including the destination ID for the UE-B transmission at the time of transmitting the request signal to the UE-A, and the UE-A may transmit the destination ID jointly again at the time of transmitting the additional information again.

For example, a priority value for the additional information transmission and/or the additional information request transmission may be (pre)configured for at least one of i) to iv) below:

i) resource pool, ii) congestion control range, iii) priority of UE-B transmission corresponding to the additional information, and/or iv) QoS parameter of UE-B transmission corresponding to the additional information As a specific example, the priority value for the additional information transmission and/or the additional information request transmission may be preconfigured for each resource pool and congestion control range. As another example, the priority value for the additional information transmission and/or the additional information request transmission may be preconfigured for each QoS parameter of the UE-B transmission corresponding to the additional information.

Various embodiments of the present disclosure may be combined with each other.

In terms of implementation, the operations (e.g., operations related to the inter-UE coordination) of the first UE (UE-A)/the second UE (UE-B) according to the above-described embodiments may be processed by apparatuses (e.g., processors 102 and 202 in FIG. 16) in FIGS. 15 to 20 to be described below.

Figure 16:
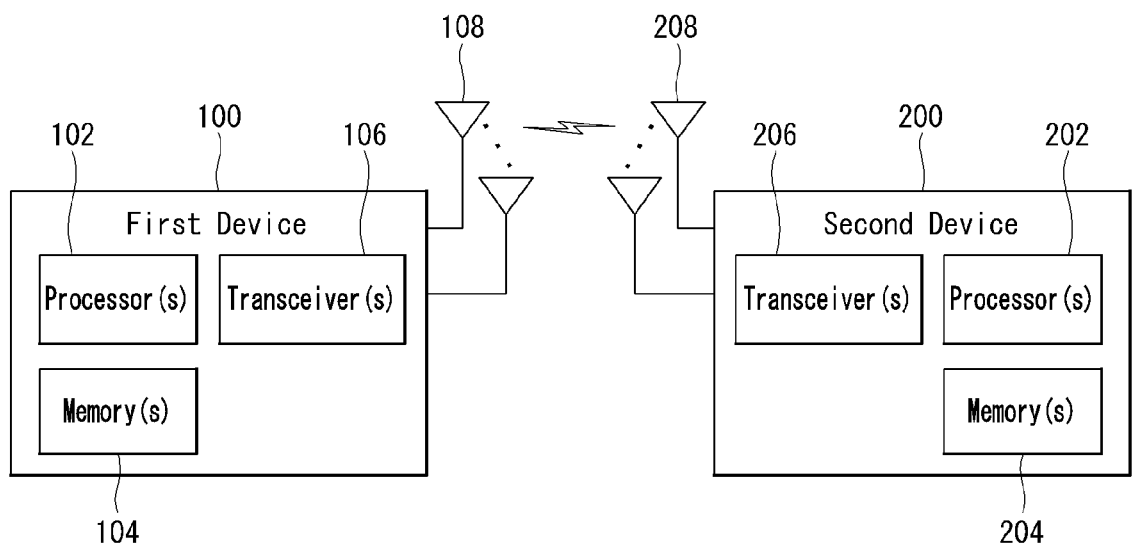
FIG. 16 shows wireless devices based on an embodiment of the present disclosure.

Further, the operations (e.g., operations related to the inter-UE coordination) of the first UE (UE-A)/the second UE (UE-B) according to the above-described embodiment may be stored in memories (e.g., one or more memories 104 and 204 in FIG. 16) in the form of a command/program (e.g., instruction or executable code) for driving at least one processor (e.g., 102 and 202 in FIG. 16).

Hereinafter, the above-described embodiments will be described in detail with reference to FIG. 13 in terms of the operation of the first UE. Methods to be described below are just distinguished for convenience and it is needless to say that some components of any one method may be substituted with some components of another method or may be applied in combination with each other unless excluded from each other.

Figure 13:
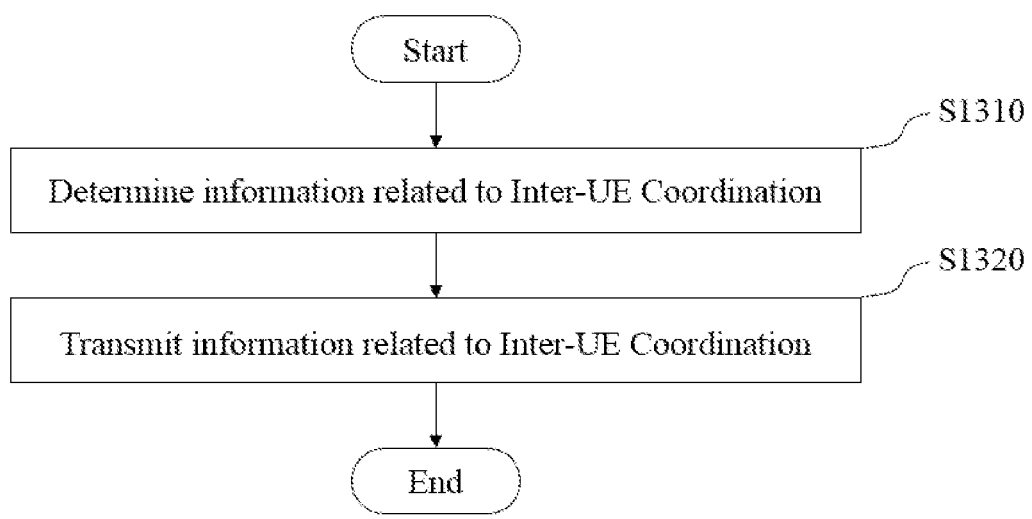
FIG. 13 is a flowchart for describing a method of transmitting, by a first UE, information related to an inter-UE coordination in a wireless communication system according to an embodiment of the present disclosure.

FIG. 13 is a flowchart for describing a method of transmitting, by a first UE, information related to an inter-UE coordination in a wireless communication system according to an embodiment of the present disclosure.

Referring to FIG. 13, a method of transmitting, by a first UE, information related to an inter-UE coordination in a wireless communication system according to an embodiment of the present disclosure may include determining information related to an inter-UE coordination (S1310) and transmitting the information related to the inter-UE coordination (S1320).

In the following description, the first UE may mean the UE-A of FIG. 12 and the second UE may mean the UE-B of FIG. 12. As an example, the first UE may be a UE that transmits coordination information to the second UE, and the second UE may be a UE that receives the coordination information from the first UE. Hereinafter, the information related to the inter-UE coordination may mean the coordination information, the additional information, and the assistance information in the above-described embodiment.

In step S1310, a first UE configures information related to an inter-UE coordination based on configuration information. As an example, the first UE may determine a preferred resource or a non-preferred resource for transmission of a second UE (scheme 1). As an example, the first terminal may determine whether a reserved resource conflicts (scheme 2). In this case, the reserved resource may mean a resource reserved by SCI (first SCI, SCI format 1-A) of the second UE.

According to an embodiment, the information related to the inter-UE coordination may be based on information representing the preferred resource related to scheme 1 or information representing a conflict of the reserved resource related to scheme 2. As an example, the related to the inter-UE coordination may include information on the preferred (or non-preferred resource) for the transmission of the second UE. As an example, the related to the inter-UE coordination may include the information indicating the conflict of the reserved resource.

According to an embodiment, the preferred resource may be determined among resources related to the transmission of the second UE. As an example, the resources related to the transmission of the second UE may be resources within a predefined resource selection window. As an example, the resources related to the transmission of the second UE may be resources within a resource selection window related to PSCCH and/or PSSCH transmission. As an example, the resources related to the transmission of the second UE may be resources within a resource selection window indicated through a request (i.e., a request for the information related to the inter-UE coordination) of the second UE.

According to an embodiment, the conflict of the reserved resource may be determined based on RSRP measured by the first UE.

According to an embodiment, the configuration information may include information on i) a first condition related to the determination of the preferred resource and ii) a second condition related to the determination of the conflict of the reserved resource. The embodiment may be based on an embodiment related to a configuration for the additional information.

Based on the information on the first condition, the preferred resource may be determined among the resources related to the transmission of the second UE.

As an example, a resource excluded from the preferred resource among the resources related to the transmission of the second UE may be determined based on the information on the first condition. The resource excluded from the preferred resource may be a resource which belongs to a predefined slot. The predefined slot (e.g., NON-MONITORED SLOT) may include a slot in which sidelink (SL) reception of the first UE is not performed.

Based on the first condition, indiscreetly many resources are excluded at the time of determining the preferred resource to prevent a problem in that available resources for the transmission of the second UE become short may be prevented.

As an example, the resource included in the preferred resource among the resources related to the transmission of the second UE may be determined based on the information on the first condition.

Based on the first condition, indiscreetly many resources are included at the time of determining the preferred resource to prevent accuracy from being lowered as the preferred resource for the inter-UE coordination.

The conflict of the reserved resource may mean a conflict between the resources reserved by the SCI (first SCI) received by the first UE. In this case, the reserved resources may be resources overlapped in time and frequency domains. The first terminal may determine whether the reserved resources conflict based on the measured RSRP and the determined RSRP threshold. Hereinafter, the RSRP threshold used at the time of determining whether the reserved resource conflicts will be described in detail.

Based on the information on the second condition, the RSRP threshold related to the RSRP measured by the first UE may be determined.

The RSRP threshold determined based on the information on the second condition may be related to one or more RSRPs among the RSRPs measured by the first UE. In this case, the RSRPs measured by the first UE is based on the RSRP measured based on the SCI (first SCI) indicating the reserved resource. As a specific example, when the first UE receives the first SCI from each of two UEs, the RSRPs measured by the first UE include the RSRP measured based on the first SCI.

As an example, the determined RSRP threshold may be related to one RSRP among the RSRPs measured by the first UE. As a specific example, when the number of RSRPs measured by the first UE is two, the first UE may determine whether the reserved resource conflicts based on the RSRP threshold related to one RSRP among two RSRPs. For example, the first UE may determine the conflict of the reserved resource based on the one RSRP being larger than the determined RSRP threshold.

As an example, the determined RSRP threshold may be related to two RSRPs among the RSRPs measured by the first UE. The first UE may determine the conflict of the reserved resource based on RSRP1, RSRP2, and the determined RSRP threshold. As a specific example, when RSRP1>RSRP2+the determined RSRP threshold (or RSRP2>RSRP1+the determined RSRP threshold), the first UE may determine the conflict of the reserved resource.

According to an embodiment, the one or more RSRPs may include an RSRP measured based on a Sidelink DeModulation Reference Signal (SL DMRS) of a predefined UE among UEs related to the reserved resources. The UEs related to the reserved resources may be based on a UE that transmits first sidelink control information (SCI) indicating the reserved resource to the first UE.

A case where the first UE receives the first SCI indicating the reserved resource from each of two UEs (a second UE and a third UE different from the second UE) may be assumed.

Based on the RSRP threshold related to one RSRP being used for determining the conflict of the reserved resource, the predefined UE may be the second UE or the third UE. That is, the first UE may determine whether the reserved resource of the second UE and the reserved resource of the third UE conflict with each other based on i) an RSRP measured based on an SL DMRS related to the SCI of the second UE (or the third UE) and ii) the RSRP threshold.

Based on the RSRP threshold related to two RSRPs being used for determining the conflict of the reserved resource, the predefined UE may be the second UE or the third UE. That is, the first UE may determine whether the reserved resource of the second UE and the reserved resource of the third UE conflict with each other based on i) an RSRP (e.g., RSRP1) measured based on the SL DMRS related to the SCI of the second UE, ii) an RSRP (e.g., RSRP2) measured based on the SL DMRS related to the SCI of the third UE, and iii) the RSRP threshold.

Based on the second condition, an RSRP threshold most suitable for a capability related to the measurement of the first UE may be utilized. That is, accuracy of the information representing the conflict of the reserved resource may be improved.

According to an embodiment, the configuration information may be based on preconfigured information or information received from a BS based on RRC signaling. As an example, the configuration information may be information preconfigured when implementing the first UE. As an example, the configuration information may be the information received from the BS. In this case, the first UE may receive the configuration information from the BS based on the RRC signaling.

The configuration information may be a higher layer parameter SL-InterUE-CoordinationConfig. In this case, the first condition may be determined/indicated/configured based on information in SL-InterUE-CoordinationScheme1 of SL-InterUE-CoordinationConfig. As an example, the first condition may be determined based on sl-Condition1-A-2 within SL-InterUE-CoordinationScheme1. The sl-Condition1-A-2 may be information indicating whether to exclude a resource which belongs to a slot in which the SL reception of the first UE is not performed (not expected) from the preferred resource due to a HALF-DUPLEX operation. As an example, based on the sl-Condition1-A-2 being set to 'disabled', the first UE does not exclude the resource which belongs to the slot in which the SL reception is not performed (not expected) from the preferred resource at the time of determining the preferred resource. As an example, based on the sl-Condition1-A-2 being not set to 'disabled', the first UE excludes the resource which belongs to the slot in which the SL reception is not performed (not expected) from the preferred resource at the time of determining the preferred resource.

The second condition may be determined/indicated/configured based on information in SL-InterUE-Coordination-Scheme2 of SL-InterUE-CoordinationConfig. As an example, the second condition may be determined based on sl-OptionForCondition2-A-1 of SL-InterUE-Coordination-Scheme2. The sl-OptionForCondition2-A-1 may be information representing the RSRP threshold used at the time of determining the conflict of the reserved resource. As an example, it may be determined that an RSRP threshold (e.g., RSRP-ThresPerPriorities) related to one RSRP is used based on a value of the sl-OptionForCondition2-A-1 being 0. As an example, it may be determined that an RSRP threshold (e.g., RSRP-ThresWithRsrpMeasurement) related to two RSRPs are used based on the value of the sl-OptionForCondition2-A-1 being 1.

According to S1310 described above, an operation of the first UE (reference numeral 100/200 in FIGS. 15 to 20) which determines the information related to the inter-UE coordination based on the configuration information may be implemented by the apparatuses in FIGS. 15 to 20. For example, referring to FIG. 16, one or more processors 102 may control one or more transceivers 106 and/or one or more memories 104 to determine the information related to the inter-UE coordination based on the configuration information.

In S1320, the first UE transmits the information related to the inter-UE coordination to the second UE. The information related to the inter-UE coordination may be transmitted through a Physical Sidelink Shared channel (PSSCH). As an example, the information related to the inter-UE coordination may be transmitted based on second stage SCI and/or a Medium Access Control-Control Element (MAC-CE). As an example, the information related to the inter-UE coordination may be included in the second stage SCI. The first terminal may transmit the second stage SCI to the second UE. As an example, the information related to the inter-UE coordination may be included in the MAC-CE (e.g., Inter-UE Coordination Information MAC CE). The first terminal may transmit the MAC-CE to the second UE.

The information related to the inter-UE coordination may be transmitted based on a predefined condition or a request (e.g., a signal for requesting the assistance information transmission or a request for the inter-UE coordination information) of the second UE. That is, the transmission of the information related to the inter-UE coordination may be triggered based on the predefined condition or the request of the second UE.

According to an embodiment, information representing the preferred resource (or non-preferred resource) related to scheme 1 above may be transmitted based on the information related to the inter-UE coordination being related to the request of the second UE. As an example, the request of the second UE may be a request for the inter-UE coordination information related to the preferred resource or the non-preferred resource. The request may be received based on the Medium Access Control-Control Element (MAC-CE) and/or the second SCI. As an example, the first UE may receive the MAC-CE and/or the second SCI including the information related to the request.

According to S1320 described above, an operation of the first UE (reference numeral 100/200 in FIGS. 15 to 20) which transmits, to the second UE (reference numeral 100/200 in FIGS. 15 to 20), the information related to the inter-UE coordination may be implemented by the apparatuses in FIGS. 15 to 20. For example, referring to FIG. 16, one or more processors 102 may control one or more transceivers 106 and/or one or more memories 104 to transmit, to the second UE 200, the information related to the inter-UE coordination.

The method may further include an SCI receiving step. As an example, the first UE receives first Sidelink Control Information (SCI) from the second UE. As an example, the first UE receives the first SCI from a third UE. As an example, the first UE receives the first Sidelink Control Information (SCI) from each of the second UE and the third UE.

The first SCI may be related to a reserved resource for transmission of the Physical Sidelink Shared channel (PSSCH). The SCI receiving step may be performed before S1310. As an example, the first UE may determine a conflict between the resource reserved based on the first SCI of the second U and the resource reserved based on the first SCI of the third UE.

According to the SCI receiving step, an operation of the first UE (reference numeral 100/200 in FIGS. 15 to 20) which receives the first SCI from the second UE (reference numeral 100/200 in FIGS. 15 to 20) may be implemented by the apparatuses in FIGS. 15 to 20. For example, referring to FIG. 16, one or more processors 102 may control one or more transceivers 106 and/or one or more memories 104 to receive the first SCI from the second UE 200.

The method may further include a step of receiving the request for the information related to the inter-UE coordination. Specifically, the first UE receives the request for the information related to the inter-UE coordination from the second UE. The request receiving step may be performed before S1310. The request for the information related to the inter-UE coordination may be related to the preferred resource or non-preferred resource for the transmission of the second UE. As an example, the first UE may transmit the information (the information related to the inter-UE coordination) representing the preferred resource to the second UE based on the request. As an example, the first UE may transmit the information (the information related to the inter-UE coordination) representing the non-preferred resource to the second UE based on the request.

According to the request receiving step, an operation of the first UE (reference numeral 100/200 in FIGS. 15 to 20) which receives, from the second UE (reference numeral 100/200 in FIGS. 15 to 20), the request for the information related to the inter-UE coordination may be implemented by the apparatuses in FIGS. 15 to 20. For example, referring to FIG. 16, one or more processors 102 may control one or more transceivers 106 and/or one or more memories 104 to receive, from the second UE 200, the request for the information related to the inter-UE coordination.

According to the embodiments (the SCI receiving step and the request receiving step), the first UE may perform steps S1310 to S1320 based on one of 1) to 3) below.
1) Determining the information related to the inter-UE coordination (S1310)—transmitting the information related to the inter-UE coordination (S1320)
2) Receiving the request for the information related to the inter-UE coordination—determining the information related to the inter-UE coordination (S1310)—transmitting the information (e.g., information representing the preferred resource) related to the inter-UE coordination (S1320)
3) Receiving the SCI—determining the information related to the inter-UE coordination (S1310)—transmitting the information (e.g., information representing the conflict of the reserved resource) related to the inter-UE coordination (S1320)

Hereinafter, the above-described embodiments will be described in detail with reference to FIG. 14 in terms of the operation of the second UE. Methods to be described below are just distinguished for convenience and it is needless to say that some components of any one method may be substituted with some components of another method or may be applied in combination with each other unless excluded from each other.

Figure 14:
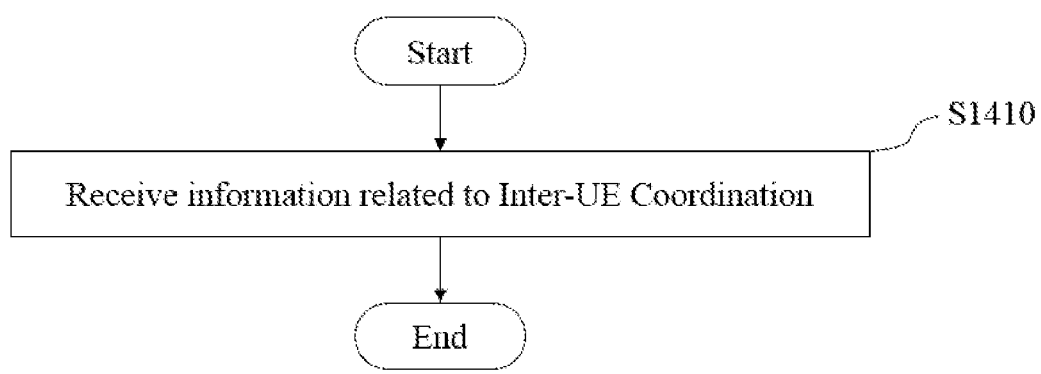
FIG. 14 is a flowchart for describing a method of receiving, by a second UE, information related to an inter-UE coordination in a wireless communication system according to another embodiment of the present disclosure.

FIG. 14 is a flowchart for describing a method of receiving, by a second UE, information related to an inter-UE coordination in a wireless communication system according to another embodiment of the present disclosure.

Referring to FIG. 14, the method for receiving, by the second UE, the information related to the inter-UE coordination in the wireless communication system according to another embodiment of the present disclosure may include receiving the information related to the inter-UE coordination (S1410).

In the following description, the second UE may mean the UE-B of FIG. 12 and the first UE may mean the UE-A of FIG. 12. As an example, the second UE may be a UE that receives coordination information from the first UE, and the first UE may be a UE that transmits the coordination information to the second UE. Hereinafter, the information related to the inter-UE coordination may mean the coordination information, the additional information, and the assistance information in the above-described embodiment.

In S1410, the second UE receives the information related to the inter-UE coordination from the first UE.

The information related to the inter-UE coordination may be determined based on configuration information. Specifically, the information related to the inter-UE coordination may be based on information determined by the first UE based on the configuration information. As an example, the first UE may determine a preferred resource or a non-preferred resource for transmission of a second UE (scheme 1). As an example, the first terminal may determine whether a reserved resource conflicts (scheme 2). In this case, the reserved resource may mean a resource reserved by SCI (first SCI, SCI format 1-A) of the second UE.

According to an embodiment, the information related to the inter-UE coordination may be based on information representing the preferred resource related to scheme 1 or information representing a conflict of the reserved resource related to scheme 2. As an example, the related to the inter-UE coordination may include information on the preferred (or non-preferred resource) for the transmission of the second UE. As an example, the related to the inter-UE coordination may include the information indicating the conflict of the reserved resource.

According to an embodiment, the preferred resource may be determined among resources related to the transmission of the second UE. As an example, the resources related to the transmission of the second UE may be resources within a predefined resource selection window. As an example, the resources related to the transmission of the second UE may be resources within a resource selection window related to PSCCH and/or PSSCH transmission. As an example, the resources related to the transmission of the second UE may be resources within a resource selection window indicated through a request (i.e., a request for the information related to the inter-UE coordination) of the second UE.

According to an embodiment, the conflict of the reserved resource may be determined based on RSRP measured by the first UE.

According to an embodiment, the configuration information may include information on i) a first condition related to the determination of the preferred resource and ii) a second condition related to the determination of the conflict of the reserved resource. The embodiment may be based on an embodiment related to a configuration for the additional information.

Based on the information on the first condition, the preferred resource may be determined among the resources related to the transmission of the second UE.

As an example, a resource excluded from the preferred resource among the resources related to the transmission of the second UE may be determined based on the information on the first condition. The resource excluded from the preferred resource may be a resource which belongs to a predefined slot. The predefined slot (e.g., NON-MONITORED SLOT) may include a slot in which sidelink (SL) reception of the first UE is not performed.

Based on the first condition, indiscreetly many resources are excluded at the time of determining the preferred resource to prevent a problem in that available resources for the transmission of the second UE become short may be prevented.

As an example, the resource included in the preferred resource among the resources related to the transmission of the second UE may be determined based on the information on the first condition.

Based on the first condition, indiscreetly many resources are included at the time of determining the preferred resource to prevent accuracy from being lowered as the preferred resource for the inter-UE coordination.

The conflict of the reserved resource may mean a conflict between the resources reserved by the SCI (first SCI) received by the first UE. In this case, the reserved resources may be resources overlapped in time and frequency domains. The first terminal may determine whether the reserved resources conflict based on the measured RSRP and the determined RSRP threshold. Hereinafter, the RSRP threshold used at the time of determining whether the reserved resource conflicts will be described in detail.

Based on the information on the second condition, the RSRP threshold related to the RSRP measured by the first UE may be determined.

The RSRP threshold determined based on the information on the second condition may be related to one or more RSRPs among the RSRPs measured by the first UE. In this case, the RSRPs measured by the first UE is based on the RSRP measured based on the SCI (first SCI) indicating the reserved resource. As a specific example, when the first UE receives the first SCI from each of two UEs, the RSRPs measured by the first UE include the RSRP measured based on the first SCI.

As an example, the determined RSRP threshold may be related to one RSRP among the RSRPs measured by the first UE. As a specific example, when the number of RSRPs measured by the first UE is two, the first UE may determine whether the reserved resource conflicts based on the RSRP threshold related to one RSRP among two RSRPs. For example, the first UE may determine the conflict of the reserved resource based on the one RSRP being larger than the determined RSRP threshold.

As an example, the determined RSRP threshold may be related to two RSRPs among the RSRPs measured by the first UE. The first UE may determine the conflict of the reserved resource based on RSRP1, RSRP2, and the determined RSRP threshold. As a specific example, when RSRP1>RSRP2+the determined RSRP threshold (or RSRP2>RSRP1+the determined RSRP threshold), the first UE may determine the conflict of the reserved resource.

According to an embodiment, the one or more RSRPs may include an RSRP measured based on a Sidelink DeModulation Reference Signal (SL DMRS) of a predefined UE among UEs related to the reserved resources. The UEs related to the reserved resources may be based on a UE that transmits first sidelink control information (SCI) indicating the reserved resource to the first UE.

A case where the first UE receives the first SCI indicating the reserved resource from each of two UEs (the second UE and a third UE different from the second UE) may be assumed.

Based on the RSRP threshold related to one RSRP being used for determining the conflict of the reserved resource, the predefined UE may be the second UE or the third UE. That is, the first UE may determine whether the reserved resource of the second UE and the reserved resource of the third UE conflict with each other based on i) an RSRP measured based on an SL DMRS related to the SCI of the second UE (or the third UE) and ii) the RSRP threshold.

Based on the RSRP threshold related to two RSRPs being used for determining the conflict of the reserved resource, the predefined UE may be the second UE or the third UE. That is, the first UE may determine whether the reserved resource of the second UE and the reserved resource of the third UE conflict with each other based on i) an RSRP (e.g., RSRP1) measured based on the SL DMRS related to the SCI of the second UE, ii) an RSRP (e.g., RSRP2) measured based on the SL DMRS related to the SCI of the third UE, and iii) the RSRP threshold.

Based on the second condition, an RSRP threshold most suitable for a capability related to the measurement of the first UE may be utilized. That is, accuracy of the information representing the conflict of the reserved resource may be improved.

According to an embodiment, the configuration information may be based on preconfigured information or information received from a BS based on RRC signaling. As an example, the configuration information may be information preconfigured when implementing the first UE. As an example, the configuration information may be the information received from the BS. In this case, the first UE may receive the configuration information from the BS based on the RRC signaling.

The configuration information may be a higher layer parameter SL-InterUE-CoordinationConfig. In this case, the first condition may be determined/indicated/configured based on information in SL-InterUE-CoordinationScheme1 of SL-InterUE-CoordinationConfig. As an example, the first condition may be determined based on sl-Condition1-A-2 within SL-InterUE-CoordinationScheme1. The sl-Condition1-A-2 may be information indicating whether to exclude a resource which belongs to a slot in which the SL reception of the first UE is not performed (not expected) from the preferred resource due to a HALF-DUPLEX operation. As an example, based on the sl-Condition1-A-2 being configured as 'disabled', the first UE does not exclude the resource which belongs to the slot in which the SL reception is not performed (not expected) from the preferred resource at the time of determining the preferred resource. As an example, based on the sl-Condition1-A-2 being not set to 'disabled', the first UE excludes the resource which belongs to the slot in which the SL reception is not performed (not expected) from the preferred resource at the time of determining the preferred resource.

The second condition may be determined/indicated/configured based on information in SL-InterUE-CoordinationScheme2 of SL-InterUE-CoordinationConfig. As an example, the second condition may be determined based on sl-OptionForCondition2-A-1 of SL-InterUE-CoordinationScheme2. The sl-OptionForCondition2-A-1 may be information representing the RSRP threshold used at the time of determining the conflict of the reserved resource. As an example, it may be determined that an RSRP threshold (e.g., RSRP-ThresPerPriorities) related to one RSRP is used based on a value of the sl-OptionForCondition2-A-1 being 0. As an example, it may be determined that an RSRP threshold (e.g., RSRP-ThresWithRsrpMeasurement) related to two RSRPs are used based on the value of the sl-OptionForCondition2-A-1 being 1.

The information related to the inter-UE coordination may be received through a Physical Sidelink Shared channel (PSSCH). As an example, the information related to the inter-UE coordination may be received based on second stage SCI and/or a Medium Access Control-Control Element (MAC-CE). As an example, the information related to the inter-UE coordination may be included in the second stage SCI. The second UE may receive the second stage SCI from the first UE. As an example, the information related to the inter-UE coordination may be included in the MAC-CE (e.g., Inter-UE Coordination Information MAC CE). The second UE may receive the MAC-CE from the first UE.

The information related to the inter-UE coordination may be received based on a predefined condition or a request (e.g., a signal for requesting the assistance information transmission or a request for the inter-UE coordination information) of the second UE. That is, the transmission of the information related to the inter-UE coordination may be triggered based on the predefined condition or the request of the second UE.

According to an embodiment, information representing the preferred resource (or non-preferred resource) related to scheme 1 above may be received based on the information related to the inter-UE coordination being related to the request of the second UE. As an example, the request of the second UE may be a request for the inter-UE coordination information related to the preferred resource or the non-preferred resource. The request may be transmitted based on the Medium Access Control-Control Element (MAC-CE) and/or the second SCI. As an example, the second UE may transmit the MAC-CE and/or the second SCI including the information related to the request.

According to S1410 described above, an operation of the second UE (reference numeral 100/200 in FIGS. 15 to 20) which receives, from the first UE (reference numeral 100/200 in FIGS. 15 to 20), the information related to the inter-UE coordination may be implemented by the apparatuses in FIGS. 15 to 20. For example, referring to FIG. 16, one or more processors 202 may control one or more transceivers 206 and/or one or more memories 204 to receive the information related to the inter-UE coordination from the first UE 100.

The second UE may select or reselect a resource for PSSCH transmission based on the information related to the inter-UE coordination.

According to an embodiment, the method may further include a resource selecting step. The second UE may select a resource for transmission of the Physical Sidelink Shared Channel (PSSCH) based on information representing the preferred resource related to scheme 1 above. In this case, the resource for the transmission of the PSSCH may include the preferred resource.

According to the resource selecting step, an operation of the second UE (reference numeral 100/200 in FIGS. 15 to 20) which selects the resource for the transmission of the PSSCH based on the information representing the preferred resource related to scheme 1 above may be implemented by the apparatuses in FIGS. 15 to 20. For example, referring to FIG. 16, one or more processors 202 may control one or more transceivers 206 and/or one or more memories to select the resource for the transmission of the Physical Sidelink Shared Channel (PSSCH) based on information representing the preferred resource related to scheme 1 above.

According to an embodiment, the method may further include an SCI transmitting step. Specifically, the second UE receives first SCI to the first UE.

The first SCI may be related to a reserved resource for transmission of the Physical Sidelink Shared channel (PSSCH). The SCI transmitting step may be performed before S1410. As an example, the first UE may determine a conflict between the reserved resource based on the first SCI of the second UE. The second UE may receive information (information related to the inter-UE coordination) representing the conflict of the reserved resource.

According to the SCI transmitting step, an operation of the second UE (reference numeral 100/200 in FIGS. 15 to 20) which transmits the first SCI from the first UE (reference numeral 100/200 in FIGS. 15 to 20) may be implemented by the apparatuses in FIGS. 15 to 20. For example, referring to FIG. 16, one or more processors 202 may control one or more transceivers 206 and/or one or more memories 204 to transmit the first SCI to the first UE 100.

According to an embodiment, the method may further include a resource reselecting step. Specifically, the second UE may reselect the resource for the transmission of the PSSCH based on the information representing the conflict of the reserved resource related to scheme 2 above. The resource (i.e., the resource served by the first SCI) related to the conflict may be excluded from the resource for the transmission of the PSSCH.

According to the resource reselecting step, an operation of the second UE (reference numeral 100/200 in FIGS. 15 to 20) which reselects the resource for the transmission of the PSSCH based on the information representing the conflict of the reserved resource related to scheme 2 above may be implemented by the apparatuses in FIGS. 15 to 20. For example, referring to FIG. 16, one or more processors 202 may control one or more transceivers 206 and/or one or more memories to reselect the resource for the transmission of the Physical Sidelink Shared Channel (PSSCH) based on information representing the conflict of the reserved resource related to scheme 2 above.

According to an embodiment, the method may further include a step of transmitting the request for the information related to the inter-UE coordination. Specifically, the second UE transmits the request for the information related to the inter-UE coordination to the first UE. The request transmitting step may be performed before S1410. The request for the information related to the inter-UE coordination may be related to the preferred resource or non-preferred resource for the transmission of the second UE. As an example, the second UE may receive the information (the information related to the inter-UE coordination) representing the preferred resource based on the request from the first UE. As an example, the second UE may receive the information (the information related to the inter-UE coordination) representing the non-preferred resource based on the request from the first UE.

According to the request transmitting step, an operation of the second UE (reference numeral 100/200 in FIGS. 15 to 20) which transmits, to the first UE (reference numeral 100/200 in FIGS. 15 to 20), the request for the information related to the inter-UE coordination may be implemented by the apparatuses in FIGS. 15 to 20. For example, referring to FIG. 16, one or more processors 202 may control one or more transceivers 206 and/or one or more memories 204 to transmit, to the first UE 100, the request for the information related to the inter-UE coordination.

According to the embodiments (the resource selecting step, the SCI transmitting step, the resource resle3ctinb step, and the request transmitting step), the second UE may perform S1410 based on one of 1) to 5) below.
1) Receiving the information related to the inter-UE coordination (S1410)
2) Transmitting the request for the information related to the inter-UE coordination—receiving the information related to the inter-UE coordination (S1410)
3) Transmitting the request for the information related to the inter-UE coordination—receiving the information (e.g., the information representing the preferred resource) related to the inter-UE coordination (S1410)—selecting the resource for the PSSCH transmission
4) Transmitting the SCI—receiving the information related to the inter-UE coordination (S1410)
5) Transmitting the SCI—receiving the information (e.g., the information representing the conflict of the reserved resource) related to the inter-UE coordination (S1410)—reselecting the resource for the PSSCH transmission Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
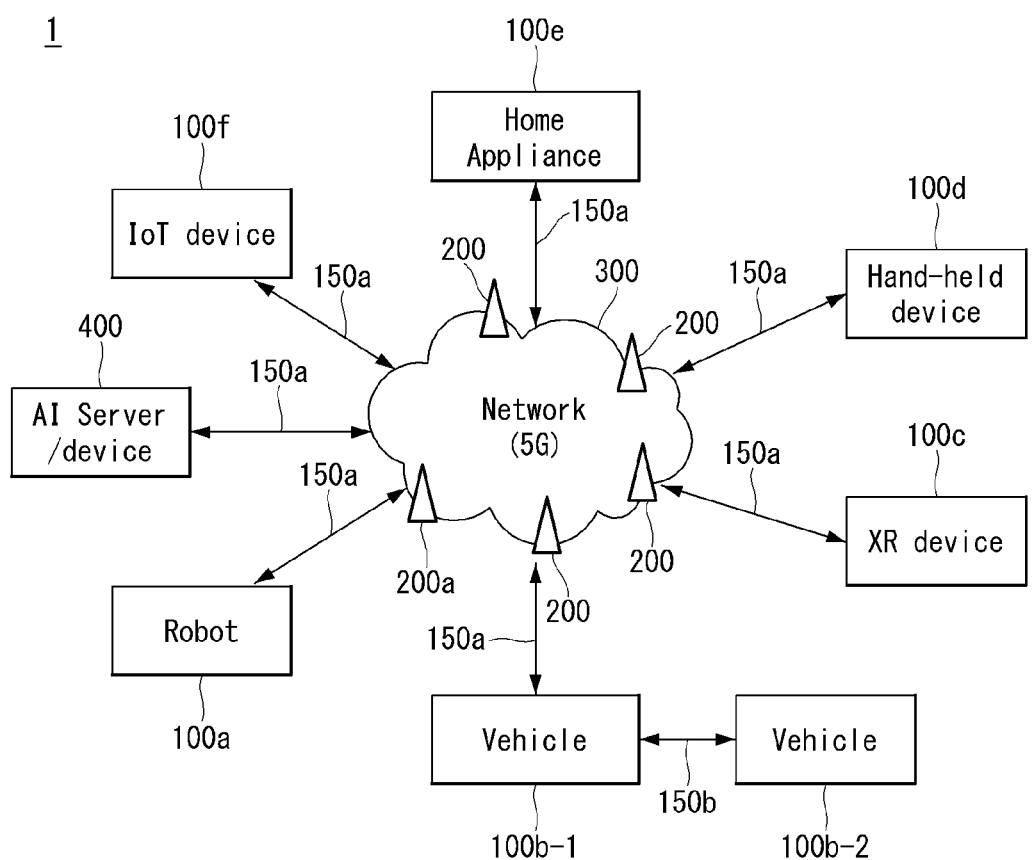
FIG. 15 shows a communication system 1 based on an embodiment of the present disclosure.

FIG. 15 shows a communication system 1 based on an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 16 shows wireless devices based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
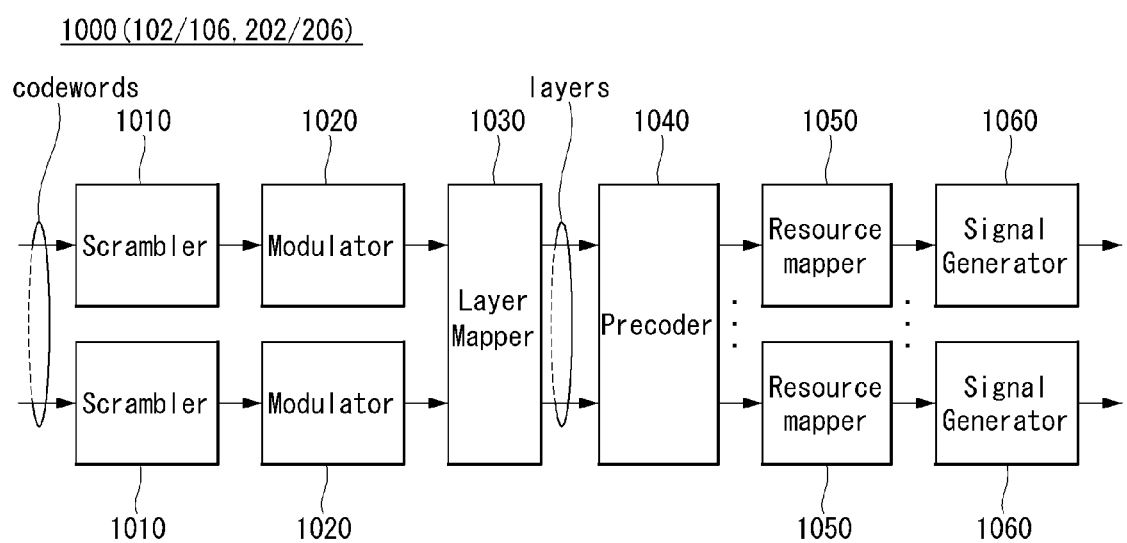
FIG. 17 shows a signal process circuit for a transmission signal based on an embodiment of the present disclosure.

FIG. 17 shows a signal process circuit for a transmission signal based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
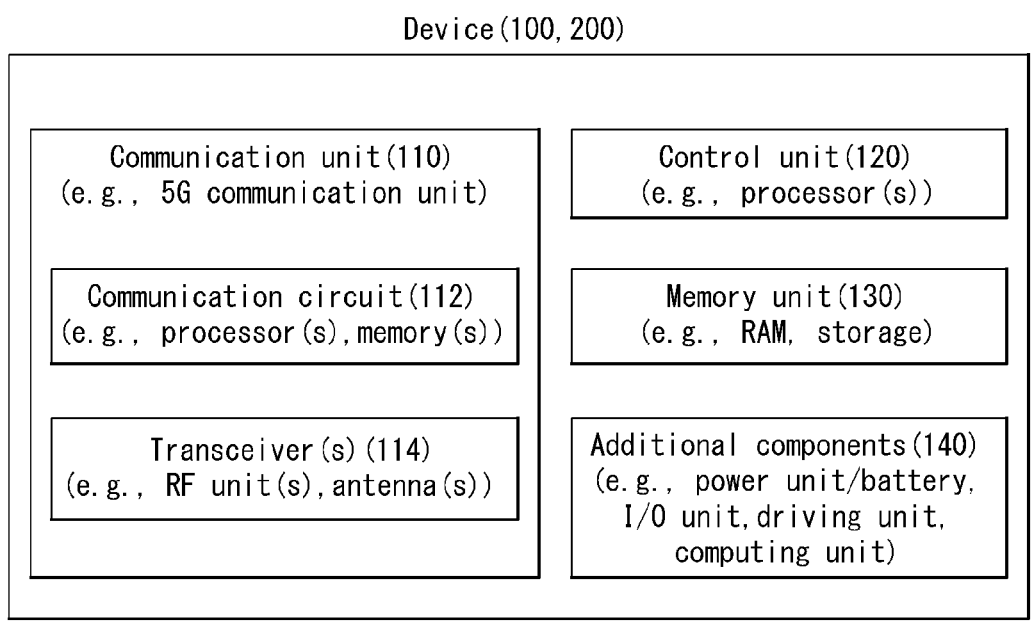
FIG. 18 shows another example of a wireless device based on an embodiment of the present disclosure.

FIG. 18 shows another example of a wireless device based on an embodiment of the present disclosure. The wireless device may be implemented in various forms based on a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place based on a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
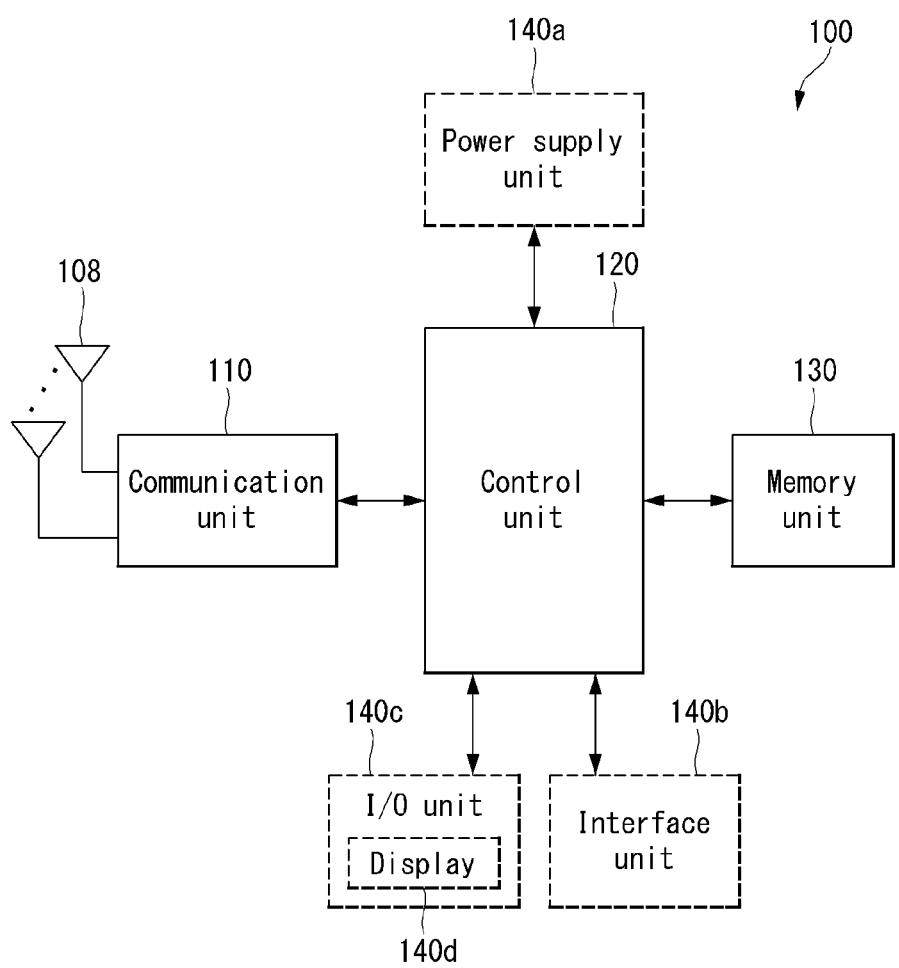
FIG. 19 shows a hand-held device based on an embodiment of the present disclosure

FIG. 19 shows a hand-held device based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
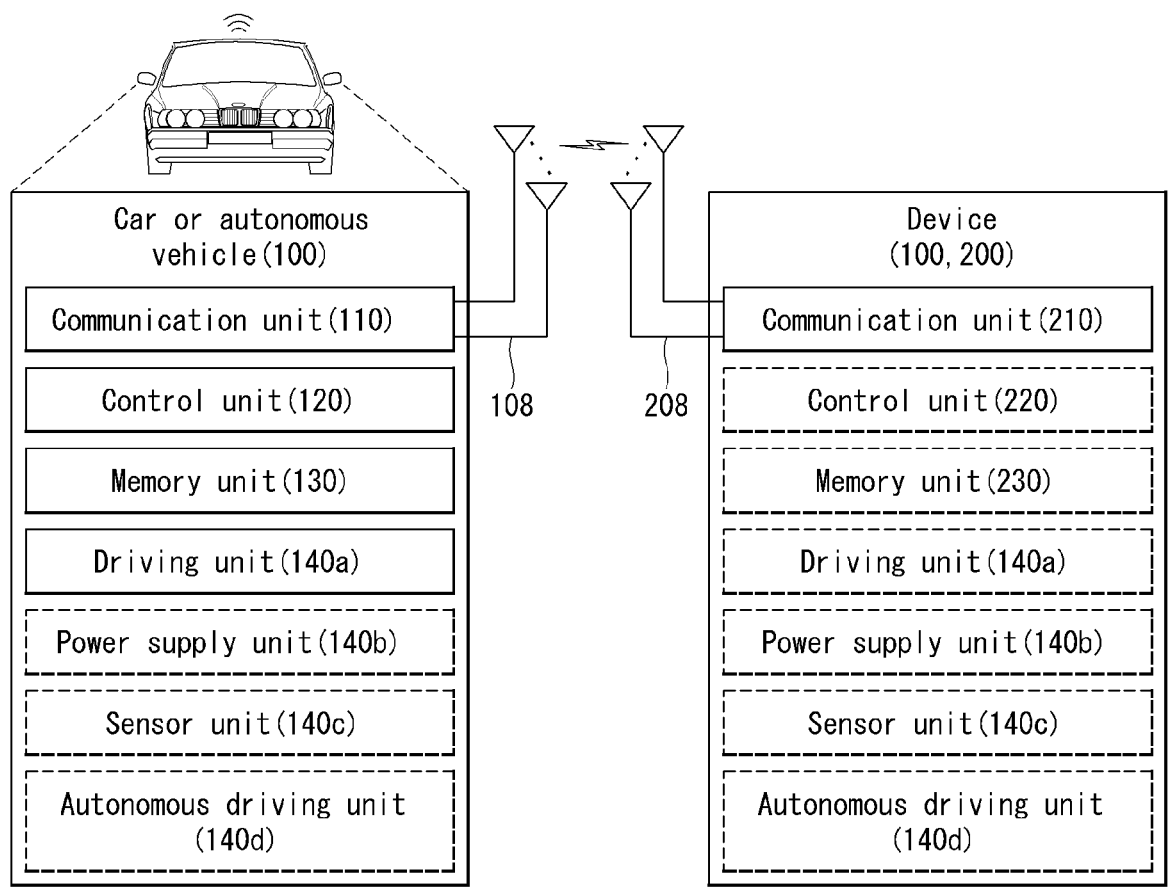
FIG. 20 shows a vehicle or an autonomous vehicle based on an embodiment of the present disclosure.

FIG. 20 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first User Equipment (UE) comprising:
   determining a conflict of reserved resources related to a scheme 2 based on configuration information, and
   transmitting, to a second UE, Inter-UE Coordination information that represents the conflict of the reserved resources,
   wherein the configuration information for a resource pool includes i) information for a first condition related to the determination of the conflict of the reserved resources and ii) information related to a type of the first UE,
   wherein the conflict of the reserved resources is determined based on a Reference Signal Received Power (RSRP) measured by the first UE,
   wherein, based on the information for the first condition, an RSRP threshold related to the RSRP measured by the first UE is determined,
   wherein, based on the information related to the type of the first UE being provided for the resource pool in which the conflict of the reserved resources is determined;
   whether a non-destination UE, which is a destination UE of another Transport Block (TB) conflicting with a TB transmitted by the second UE, can transmit the Inter-UE Coordination information based on the scheme 2 is indicated, and
   the first UE is one of a destination UE of the TB transmitted by the second UE and the non-destination UE of the TB transmitted by the second UE.

2. The method of claim 1, wherein the determined RSRP threshold is related to one or more RSRPs among RSRPs measured by the first UE.

3. The method of claim 2, wherein the one or more RSRPs include an RSRP measured based on a Sidelink DeModulation Reference Signal (SL DMRS) of a predefined UE among UEs related to the reserved resources.

4. The method of claim 3, wherein the UEs related to the reserved resources are based on a UE that transmits first sidelink control information (SCI) indicating a resource reserved for the first UE.

5. The method of claim 1, wherein the configuration information is based on pre-configured information or information received, from a base station, based on Radio Resource Control (RRC) signaling.

6. A first UE comprising:
   one or more transceivers;
   one or more processors controlling the one or more transceivers; and
   one or more memories operatively connected to the one or more processors,
   wherein the one or more memories store instructions of performing operations based on being executed by the one or more processors, and
   wherein the operations include:
   determining a conflict of reserved resources related to a scheme 2 based on configuration information, and
   transmitting, to a second UE, Inter-UE Coordination information that represents the conflict of the reserved resources,
   wherein the configuration information for a resource pool includes i) information for a first condition related to the determination of the conflict of the reserved resources and ii) information related to a type of the first UE,
   wherein the conflict of the reserved resources is determined based on a Reference Signal Received Power (RSRP) measured by the first UE,
   wherein, based on the information for the first condition, an RSRP threshold related to the RSRP measured by the first UE is determined,
   wherein, based on the information related to the type of the first UE being provided for the resource pool in which the conflict of the reserved resources is determined;
   whether a non-destination UE, which is a destination UE of another Transport Block (TB) conflicting with a TB transmitted by the second UE, can transmit the Inter-UE Coordination information based on the scheme 2 is indicated, and
   the first UE is one of a destination UE of the TB transmitted by the second UE and the non-destination UE of the TB transmitted by the second UE.

7. One or more non-transitory computer-readable media storing one or more instructions, wherein the one or more instructions perform operations based on being executed by one or more processors of a first User Equipment (UE), and
   wherein the operations include:
   determining a conflict of reserved resources related to a scheme 2 based on configuration information, and
   transmitting, to a second UE, Inter-UE Coordination information that represents the conflict of the reserved resources,
   wherein the configuration information for a resource pool includes i) information for a first condition related to the determination of the conflict of the reserved resources and ii) information related to a type of the first UE,
   wherein the conflict of the reserved resources is determined based on a Reference Signal Received Power (RSRP) measured by the first UE,
   wherein, based on the information for the first condition, an RSRP threshold related to the RSRP measured by the first UE is determined, wherein, based on the information related to the type of the first UE being provided for the resource pool in which the conflict of the reserved resources is determined;

whether a non-destination UE, which is a destination UE of another Transport Block (TB) conflicting with a TB transmitted by the second UE, can transmit the Inter-UE Coordination information based on the scheme 2 is indicated, and the first UE is one of a destination UE of the TB transmitted by the second UE and the non-destination UE of the TB transmitted by the second UE.

8. A method performed by a second User Equipment (UE) comprising:

receiving, from a first UE, Inter-UE Coordination information that represents a conflict of reserved resources related to a scheme 2, wherein configuration information for a resource pool includes i) information for a first condition related to a determination of a conflict of the reserved resources and ii) information related to a type of the first UE, wherein the conflict of the reserved resources is determined based on a Reference Signal Received Power (RSRP) measured by the first UE, wherein, based on the information for the first condition, an RSRP threshold related to the RSRP measured by the first UE is determined, wherein, based on the information related to the type of the first UE being provided for the resource pool in which the conflict of the reserved resources is determined;

whether a non-destination UE, which is a destination UE of another Transport Block (TB) conflicting with a TB transmitted by the second UE, can transmit the Inter-UE Coordination information based on the scheme 2 is indicated, and the first UE is one of a destination UE of the TB transmitted by the second UE and the non-destination UE of the TB transmitted by the second UE.

9. The method of claim 8, further comprising:
transmitting first sidelink control information (SCI),
wherein the first SCI is related to a reserved resource for a transmission of a Physical Sidelink Shared channel (PSSCH).

10. The method of claim 9, further comprising:
reselecting the reserved resource for the transmission of the PSSCH based on the Inter-UE Coordination information that represents the conflict of the reserved resources related to the scheme 2.

11. A second UE comprising:

one or more transceivers;

one or more processors controlling the one or more transceivers; and one or more memories operatively connected to the one or more processors, wherein the one or more memories store instructions of performing operations based on being executed by the one or more processors, and wherein the operations include;

receiving, from a first UE, Inter-UE Coordination information that represents a conflict of reserved resources related to a scheme 2, wherein a configuration information for a resource pool includes i) information for a first condition related to a determination of a conflict of the reserved resources and ii) information related to a type of the first UE, wherein the conflict of the reserved resources is determined based on a Reference Signal Received Power (RSRP) measured by the first UE, wherein, based on the information for the first condition, an RSRP threshold related to the RSRP measured by the first UE is determined, wherein, based on the information related to the type of the first UE being provided for the resource pool in which the conflict of the reserved resources is determined;

whether a non-destination UE, which is a destination UE of another Transport Block (TB) conflicting with a TB transmitted by the second UE, can transmit the Inter-UE Coordination information based on the scheme 2 is indicated, and the first UE is one of a destination UE of the TB transmitted by the second UE and the non-destination UE of the TB transmitted by the second UE.

* * * * *